(12) United States Patent  
Limaye et al.

(10) Patent No.: US 9,256,660 B2  
(45) Date of Patent: Feb. 9, 2016

(54) RECONCILIATION PROTOCOL AFTER ICR SWITCHOVER DURING BULK SYNC

(71) Applicant: Telefonaktiebolaget L M Ericsson (publ), Stockholm (SE)

(72) Inventors: Namrata Limaye, Fremont, CA (US); Renhua Wen, San Ramon, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 173 days.

(21) Appl. No.: 13/960,753

(22) Filed: Aug. 6, 2013

(65) Prior Publication Data

US 2015/0046396 A1    Feb. 12, 2015

(51) Int. Cl.
*G06F 17/30* (2006.01)
*H04L 12/939* (2013.01)

(52) U.S. Cl.
CPC ........ *G06F 17/30575* (2013.01); *H04L 49/552* (2013.01); *H04L 49/557* (2013.01)

(58) Field of Classification Search
USPC ............................ 707/610–625; 370/219–220
See application file for complete search history.

(56) References Cited

U.S. PATENT DOCUMENTS

| | | | | |
|---|---|---|---|---|
| 6,898,189 B1 * | 5/2005 | Di Benedetto et al. | ........ | 370/256 |
| 6,912,197 B2 * | 6/2005 | Mahamuni | ..................... | 370/219 |
| 7,116,634 B1 * | 10/2006 | Hanselmann | ................. | 370/219 |
| 7,599,284 B1 * | 10/2009 | Di Benedetto et al. | ....... | 370/216 |
| 7,783,591 B2 * | 8/2010 | Long et al. | ..................... | 707/802 |
| 8,677,169 B2 * | 3/2014 | Haag | .......................... | G06F 9/52 |
| | | | | 713/375 |
| 8,693,398 B1 * | 4/2014 | Chaganti | ............. | H04L 37/1034 |
| | | | | 370/328 |
| 2004/0047286 A1 | 3/2004 | Larsen et al. | | |
| 2005/0265346 A1 | 12/2005 | Ho et al. | | |
| 2006/0062142 A1 * | 3/2006 | Appanna | ................. | H04L 45/04 |
| | | | | 370/219 |
| 2006/0126619 A1 * | 6/2006 | Teisberg et al. | ............... | 370/389 |
| 2007/0253328 A1 | 11/2007 | Harper et al. | | |
| 2008/0082630 A1 | 4/2008 | Molotchko et al. | | |
| 2009/0125995 A1 * | 5/2009 | Vercellone et al. | ................ | 726/6 |
| 2009/0279549 A1 * | 11/2009 | Ramanathan | ............. | G06F 8/65 |
| | | | | 370/395.4 |
| 2011/0194556 A1 * | 8/2011 | Butler et al. | ................... | 370/389 |
| 2012/0290869 A1 * | 11/2012 | Heitz | ...................... | H04L 69/16 |
| | | | | 714/4.11 |
| 2013/0051219 A1 * | 2/2013 | Bajamahal | .............. | H04L 45/02 |
| | | | | 370/220 |
| 2013/0054789 A1 * | 2/2013 | Bajamahal | .......... | H04L 41/0873 |
| | | | | 709/224 |
| 2013/0258839 A1 * | 10/2013 | Wang | ................ | H04L 41/06668 |
| | | | | 370/221 |

* cited by examiner

*Primary Examiner* — Hanh Thai
(74) *Attorney, Agent, or Firm* — Nicholson De Vos Webster & Elliott, LLP

(57) ABSTRACT

According to one embodiment, a method for performing reconciliation sync includes a first network device configured as an active inter-chassis redundancy (ICR) device in response to detecting a switchover request while performing a bulk sync transitioning to serving as the standby ICR device and performing a reconciliation sync while serving as the standby ICR device, the reconciliation sync comprises starting a transmission of session records that failed to be transmitted during the bulk sync to the second network device.

According to one embodiment, a method for performing reconciliation sync includes a first network device configured as a standby ICR device receiving a plurality of session records from a second network device of the ICR system. The method further includes updating a global version number based on record version numbers of the received plurality of session records, and maintaining local session records based on the received plurality of session records.

20 Claims, 18 Drawing Sheets

1100

1105
Perform a bulk sync in response to detecting the second network device is configured as the standby ICR device, wherein the bulk sync comprises starting a transmission of all session records maintained at the first network device of the ICR system to the second network device of the ICR system

↓ 1110

In response to detecting a switchover request while performing the bulk sync, transition to serving as the standby ICR device of the ICR system, and perform a reconciliation sync while serving as the standby ICR device, wherein the reconciliation sync comprises starting a transmission of all remaining session records that failed to be transmitted during the bulk sync to the second network device of the ICR system.

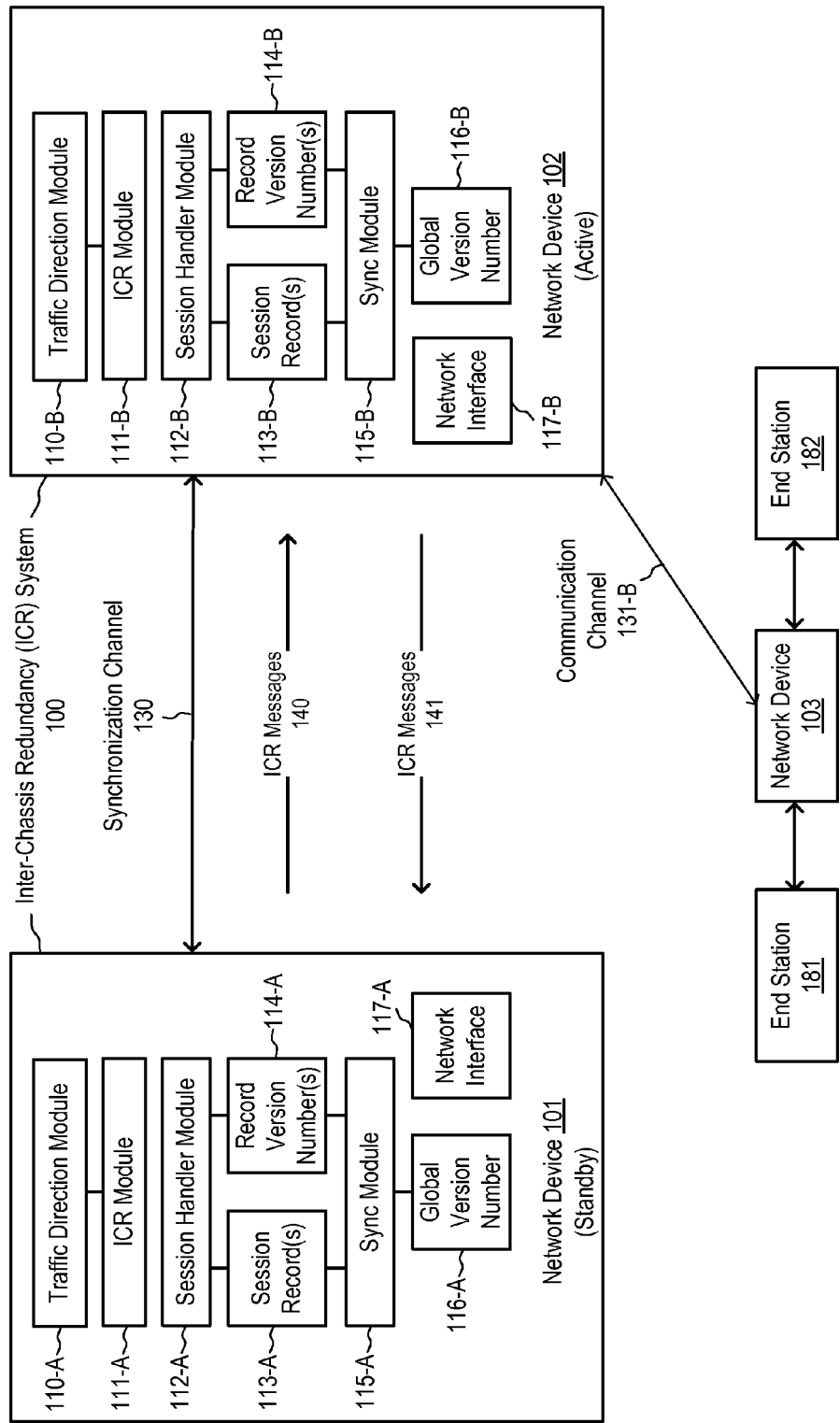

RECONCILIATION PROTOCOL AFTER ICR SWITCHOVER DURING BULK SYNC

FIELD OF THE INVENTION

Embodiments of the present invention relate generally to packet networks. More particularly, this invention relates to reconciliation of session records of inter-chassis redundancy (ICR) devices after a switchover during bulk sync of session records.

BACKGROUND

In communication networks, it is generally desirable to prevent service outages and/or loss of network traffic. By way of example, such service outages and/or loss of network traffic may occur when a network device fails, loses power, is taken offline, is rebooted, a communication link to the network device breaks, etc.

In order to prevent such service outages and/or loss of network traffic, the communication networks may utilize inter-chassis redundancy (ICR). In an ICR system, there are typically two ICR devices (i.e., nodes). There may, however, be more than two ICR devices in an ICR system. During normal operation, one ICR device is configured to be in active state while the other is configured to be in standby state. The active ICR device is responsible for handling network traffic with a plurality other network devices (e.g., end stations), including, for example, allocating Internet Protocol (IP) addresses to such end stations. During a switchover, the active and standby ICR devices switch roles, e.g., the active ICR device becomes the standby ICR device, and the standby ICR device becomes the active ICR device.

Each active ICR device maintains session records and ICR related resources (which shall herein be simply referred to as session records) that are required for handling network traffic with the end stations. In order for a standby ICR device to seamlessly handle network connections with the end stations after a switchover event, the session records must be synced from the active to standby ICR device. Conventionally, when an ICR device initially comes up as a standby ICR device, a bulk sync process is performed. As used herein, a bulk sync refers to the transmitting (i.e., copying) of all session records from the active ICR device to the standby device when the standby ICR device initially becomes part of the ICR system.

During the bulk sync process, there may be one or more switchover events that require a standby ICR device to become the active ICR device and commence handling of network traffic with the end stations. This is problematic because the standby ICR device may not have received all the most up to date session records due to the fact that the bulk sync process had been interrupted by the switchover event.

In some instances, multiple ICR devices may be configured as active ICR devices. This is known as a split-brain configuration. In such a scenario, each active ICR device maintains session records with the end station(s) that it has a network connection with. These session records, however, do not exist on the peer active ICR device. When the split-brain scenario is resolved, only one ICR device remains as the active ICR device. Conventionally, a standby ICR device does not sync/transmit session records to an active ICR device. This is problematic because the sole active ICR device does not have the session records needed to manage the network connections that were previously managed by the peer active ICR devices during the split-brain scenario.

SUMMARY

Exemplary methods for performing reconciliation sync includes a first network device configured as an active ICR device of the ICR system performing a bulk sync in response to detecting a second network device is configured as the standby ICR device, wherein the bulk sync comprises starting a transmission of all session records maintained at the first network device of the ICR system to the second network device of the ICR system. In one embodiment, the exemplary method includes in response to detecting a switchover request while performing the bulk sync the first network device transitioning to serving as the standby ICR device of the ICR system, and performing a reconciliation sync while serving as the standby ICR device, wherein the reconciliation sync comprises starting a transmission of all remaining session records that failed to be transmitted during the bulk sync to the second network device of the ICR system.

Exemplary methods for performing reconciliation sync includes a first network device configured as a standby ICR device of the ICR system receiving a plurality of session records from the second network device of the ICR system. In one embodiment, the exemplary method includes updating a global version number based on record version numbers of the received plurality of session records. In one embodiment, the exemplary method further includes maintaining local session records based on the received plurality of session records (113-A).

BRIEF DESCRIPTION OF THE DRAWINGS

Embodiments of the invention are illustrated by way of example and not limitation in the figures of the accompanying drawings in which like references indicate similar elements.

FIG. 1B is a block diagram illustrating an inter-chassis redundancy (ICR) system according to one embodiment.

DETAILED DESCRIPTION

Figure 1A:
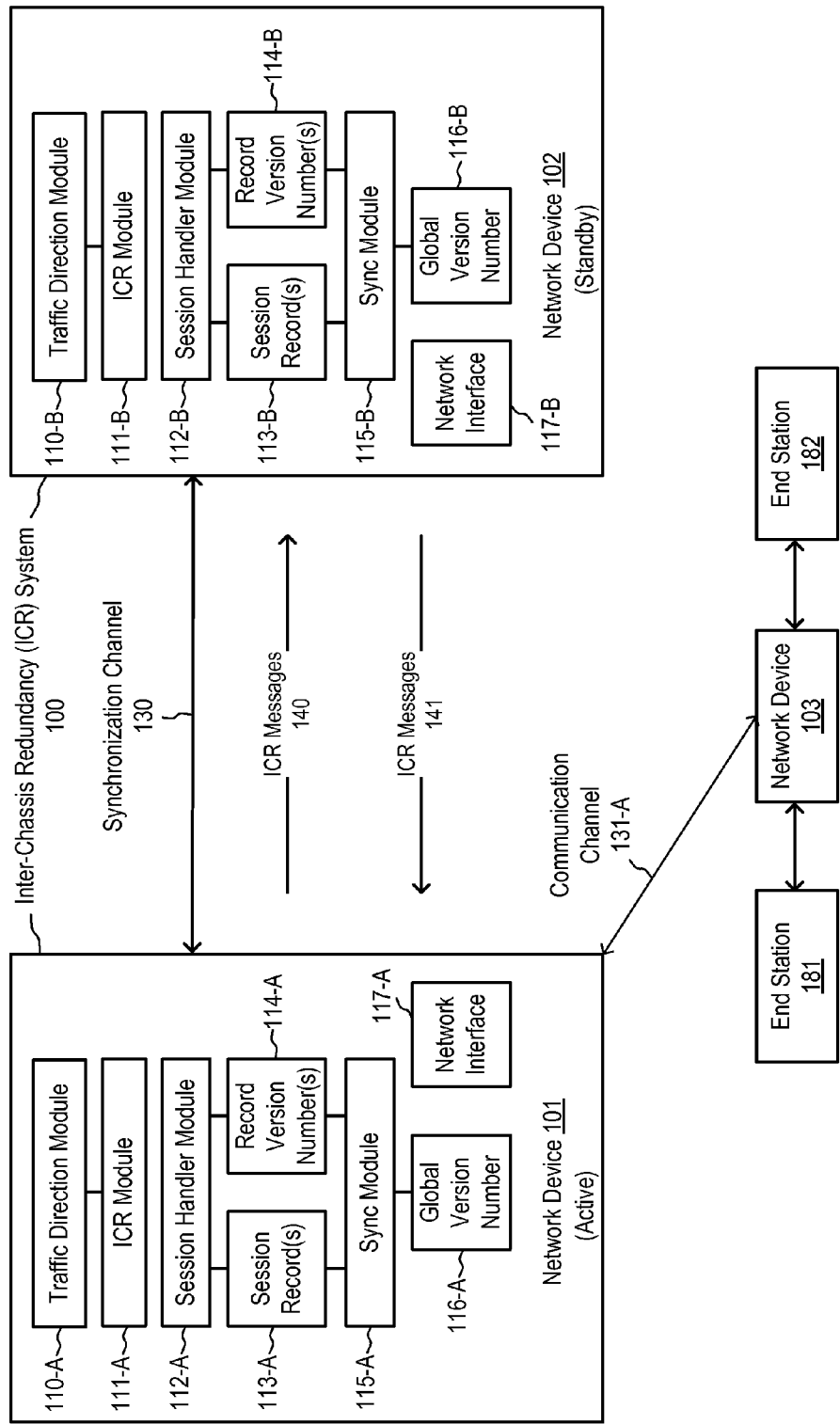
FIG. 1A is a block diagram illustrating an inter-chassis redundancy (ICR) system according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network device (e.g., a router, switch, bridge) is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer-to-peer (P2P) service, and may include, for example, public webpages (e.g., free content, store fronts, search services), private webpages (e.g., user-name/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

Some network devices provide support for implementing VPNs (Virtual Private Networks) (e.g., Layer 2 VPNs and/or Layer 3 VPNs). For example, the network device where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other network devices). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge network device that supports multiple contexts may be deployed as a PE; and a context may be configured with a VPN protocol, and thus that context is referred as a VPN context.

As used herein, a network interface may be physical or virtual; and an interface address is an IP address assigned to a network interface, be it a physical network interface or virtual network interface. A physical network interface is hardware in a network device through which a network connection (i.e., session) is made (e.g., wirelessly through a wireless network interface card (WNIC) or through plugging in a cable to a port connected to a network interface card (NIC)). Typically, a network device has multiple physical network interfaces. A virtual network interface may be associated with a physical network interface, with another virtual interface, or stand on its own (e.g., a loopback interface, a point to point protocol interface). A network interface (physical or virtual) may be numbered (a network interface with an IP address) or unnumbered (a network interface without an IP address). A loopback interface (and its loopback address) is a specific type of virtual network interface (and IP address) of a node (physical or virtual) often used for management purposes; where such an IP address is referred to as the nodal loopback address. The IP address(es) assigned to the network interface(s) of a network device, are referred to as IP addresses of that network device; at a more granular level, the IP address(es) assigned to network interface(s) assigned to a node implemented on a network device, can be referred to as IP addresses of that node.

Figure 1C:
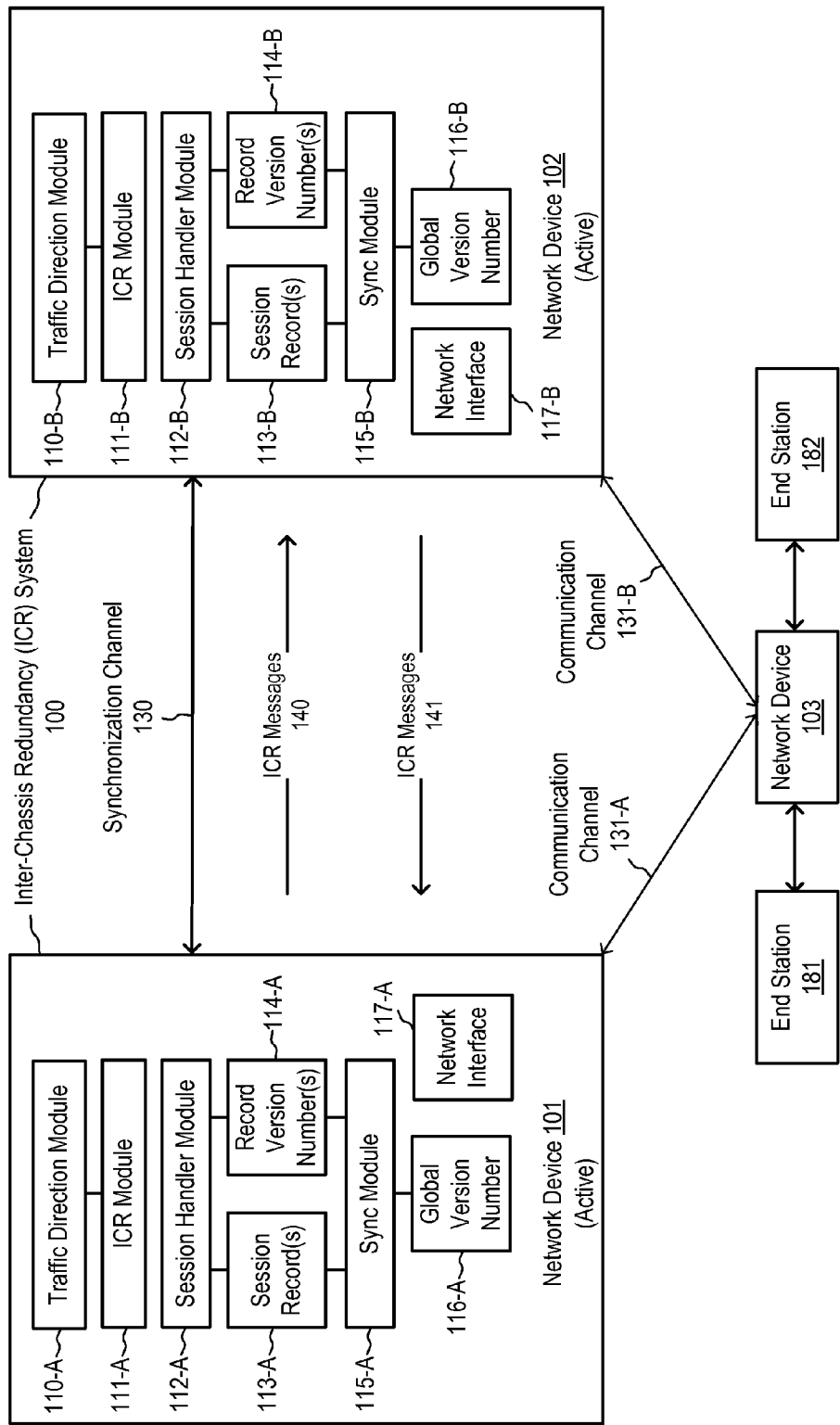
FIG. 1C is a block diagram illustrating an inter-chassis redundancy (ICR) system according to one embodiment.

FIGS. 1A-1C are block diagrams illustrating ICR system 100 according to one embodiment. FIG. 1A illustrates network devices 101 and 102 are serving as active and standby ICR devices, respectively. FIG. 1A illustrates network device 103 communicatively coupled to network device 101 over communication channel 131-A. FIG. 1B illustrates that a switchover request has been detected by the devices. As used herein, a switchover refers to the ICR devices switching roles, e.g., from active to standby, and vice versa. In response to the switchover, network devices 101 and 102 have switched roles, such that network devices 101 and 102 serve as standby and active ICR devices, respectively. FIG. 1B illustrates network device 103 communicatively coupled to network device 102 over communication channel 131-B.

Referring now to FIG. 1A. ICR system 100 includes network device 101 and 102. FIG. 1A illustrates by way of example and not limitation, network device 101 and 102 configured to be active and standby ICR network devices, respectively. This configuration shall herein be referred to as the active/standby state configuration. Network devices 101 and 102, however, can switch roles as described in further details below. ICR system 100 is communicatively coupled to network device 103, which can be a router, switch, etc. Subscriber end stations 181-182 can establish connections (e.g., sessions) with ICR system 100 through network device 103. Subscriber end stations 181-182 can be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc.

ICR system 100 helps to prevent, or at least reduce, service outages and/or loss of network traffic when the various different types of failure events occur (e.g., software process crashes and/or failure of one or more backed up hardware resources within the chassis of network devices 101 or 102). The resilience and/or the switchover of active roles between network devices 101 and 102 can be transparent to end stations 181-182. End stations 181-182 may not be aware, or not need to be aware, that they are connecting to a different network device when a switchover event occurs.

In some embodiments, ICR system 100 represents a geographically distributed ICR system to provide geographical redundancy of session or network traffic data. Network devices 101 and 102 can reside at different geographical locations (e.g., locations at least several miles apart, different towns or cities, different states, different countries, etc.). Such a geographically distributed ICR system helps to prevent, or at least reduce, service outages and/or loss of network traffic, when geographically localized disruption of service occurs (e.g., due to catastrophic weather, local loss of power, or other geographically localized events occurring at one but typically not both geographical locations).

Network devices 101 and 102 include traffic direction modules 110-A and 110-B, respectively. Traffic direction modules 110-A and 110-B are configured to send traffic attributes to network device 103 that can influence whether network device 103 routes traffic to network device 101 or 102. For example, traffic direction module 110-A can send traffic attributes that are more favorable than those sent by traffic direction module 110-B, thus influencing (i.e., attempting to cause) network device 103 to route network traffic to network device 101 rather network device 102. As used herein, "more" or "less" favorable are relative terms, describing the traffic attributes of the sending ICR network device relative to the peer ICR device.

Traffic direction modules 110-A and 110-B can be implemented as one of various routing protocols, such as Border Gateway Protocol (BGP), Interior Gateway Protocol(s) (e.g., Open Shortest Path First (OSPF), Routing Information Protocol (RIP), Intermediate System to Intermediate System (IS-IS), Label Distribution Protocol (LDP), Resource Reservation Protocol (RSVP), etc. Regardless of which routing protocol is utilized, traffic direction modules 110-A and 110-B are configured to communicate with and provide routing information to network device 103 to enable network device 103 to decide whether to route network traffic (originating from or terminating at end stations 181-182) to/from network device 101 or network device 102.

By way of example, in an embodiment where traffic direction modules 110-A and 110-B are implemented as BGP modules, there are different mechanisms to influence the routing decision. In some embodiments, Autonomous System (AS) path length may be used to influence the routing decision (e.g., a network device serving as a standby ICR network device can advertise an AS path length that is longer than an AS path length advertised by the active ICR network device). In some embodiments, relatively more AS path prepends can be used by the standby ICR network device while less AS path prepends can be used by the active ICR network device. In general, a route having more AS path prepends tends to be less desirable than a route having fewer AS path prepends. Use of AS path prepends allows both ICR network devices to have the same prefixes, but only have traffic routed to the network device having fewer AS path prepends. As illustrated in FIG. 1, traffic direction modules 110-A and 110-B have provided routing information to network device 103 such that network device 103 has decided to route network traffic to network device 101 over communication channel 131-A.

Network devices 101 and 102 include ICR modules 111-A and 111-B, respectively. ICR modules 111-A and 111-B are configured to cause traffic direction modules 110-A and 110-B, respectively, to send traffic attributes to network device 103 based on the current state of the ICR device. By way of example, as illustrated in FIG. 1, initially ICR module 111-A causes traffic direction module 110-A to send traffic attributes that are more favorable than traffic attributes sent by traffic direction module 110-B because network device 101 is serving as the active ICR device. By sending more favorable traffic attributes, ICR module 111-A attempts to cause network device 103 to route network traffic to network device 101 while it is serving as an active ICR device. Subsequently, ICR module 111-B causes traffic direction module 110-B to send traffic attributes that are less favorable than traffic attributes sent by traffic direction module 110-A because network device 102 is serving as the standby ICR device. By sending less favorable traffic attributes, ICR module 111-B attempts to cause network device 103 to route network traffic away from network device 102 while it is serving as a standby ICR device.

ICR modules 111-A and 111-B are configured to exchange ICR messages 140-141 over synchronization channel 130 via network interfaces 117-A and 117-B. ICR messages 140-141 can include information relating to the state of the sending ICR network device. By way of example, ICR messages 140 can include information to notify network device 102 that network device 101 is serving as an active or standby ICR device, and ICR messages 141 can include information to notify network device 101 that network device 102 is serving as a active or standby ICR device. ICR messages 140-141 can also include messages necessary for performing bulk sync and reconciliation sync. For example, ICR messages 140-141 can include session records 113-A and/or session records 113-B that are transmitted during the bulk sync and reconciliation sync processes. Other messages that are exchanged via network interfaces 117-A and 117-B over synchronization channel 130 shall become apparent through the discussion of other figures below. ICR messages 140-141 can be exchanged using various protocols such as User Datagram Protocol (UDP), Transmission Control Protocol (TCP), and other packet transmission protocols known in the art.

Network devices 101 and 102 include session handler modules 112A and 112-B, respectively. Session handler 112-A is configured to handle network sessions that may have been established with end stations 181 and/or 182, while network device 101 is serving as an active ICR device. Session handler 112-B is configured to handle network sessions that may have been established with end stations 181 and/or 182, while network device 102 is serving as an active ICR device. The state of each network session is stored as part of session records 113-A and/or 113-B. The type of session handler module varies depending upon the particular implementation of the ICR system (e.g., the network in which it is deployed, etc.). In some embodiments, as will be explained further below, ICR system 100 can be deployed in a mobile backhaul (e.g., a Long Term Evolution (LTE) wireless network), in which case, session handler modules 112A and 112-B can be Evolved Packet Core (EPC) modules (e.g., configured to implement Serving Gateway and/or Packet Data Network (PDN) Gateway functionalities).

Each session that exists between an ICR device and an end station is represented by one or more corresponding session records 113-A or 113-B. For example, network devices 101 can use a first session record of session records 113-A to communicate with end station 181, and a second session record of session records 113-A to communicate with end station 182. Similarly, when network device 102 is serving as an active ICR device, it can use session records 113-B to communicate with end stations 181-182. In one embodiment, network devices 101 and 102 also include one or more record version numbers 114-A and 114-B. Each record version number of record version numbers 114-A and 114-B corresponds to a session record of session records 113-A and 113-B, respectively.

In one embodiment, network devices 101 and 102 include sync modules 115-A and 115-B for performing bulk sync and reconciliation sync of session records. As used herein, bulk sync refers to the synchronization (e.g., copying/transmitting) of session records by an active ICR device to a standby device so that the standby device has the necessary information/records to "take over" as the active ICR device after a switchover event. As used herein, reconciliation sync refers to the synchronization of session records by a standby ICR device to an active ICR device when a bulk sync fails to complete due to a switchover event. The session records that are transmitted as part of the reconciliation sync are those that failed to be synchronized/transmitted by the standby ICR device while it was performing a bulk sync as the previous active ICR device. In one embodiment, network devices 101 and 102 include global version numbers 116-A and 116-B for determining which session records need to be transmitted as part of a reconciliation sync. Details of bulk sync and reconciliation sync are provided further below.

FIG. 1A illustrates an ICR system configuration in which network device 101 is configured to serve as an active ICR device and network device 102 is configured to serve as a standby ICR device. An active ICR device is responsible for handling network communication with one or more end stations. As described above, the active ICR device maintains a session record (e.g., session records 113-A and 113-B) for each of its network connection with an end station. The roles of the ICR devices, however, may change. For example, an active ICR device may transition to serving as a standby ICR device, and vice versa. This is known as a switchover event. In order to achieve a seamless switchover, when an active ICR device detects a new ICR device configured as a standby ICR device, the active ICR device performs a bulk sync. The bulk sync enables the active ICR device to transmit all the local session records to the standby ICR device, allowing the standby ICR device to seamlessly take over as the active ICR device after a switchover event.

A bulk sync, however, may be interrupted by a switchover event. In other words, a switchover event may occur while the bulk sync is being performed. This results in the standby ICR device not receiving all the necessary session records to handle the network connections with all the end stations. The ICR devices of the present invention overcome this limitation by performing a reconciliation sync when an interrupted bulk sync is detected.

FIG. 1B is similar to FIG. 1A except that the configuration of network devices 101 and 102 are different. FIG. 1B illustrates that a switchover event has occurred, causing network device 101 to switch role and serve as the standby ICR device of ICR system 100. The switchover event also causes network device 102 to switch role and serve as the active ICR device of ICR system 100.

FIG. 1C is similar to FIG. 1A except that the configuration of network devices 101 and 102 are different from that illustrated in FIG. 1A. FIG. 1C illustrates a split-brain configuration. As used herein, a split-brain configuration refers to an ICR system configuration wherein multiple ICR devices have been configured to serve as active ICR devices. As illustrated in FIG. 1C, both network devices 101 and 102 have been configured to serve as active ICR devices. A split-brain configuration is problematic for handling network connections seamlessly after resolution of the split-brain because an active ICR device conventionally does not sync session records to another active ICR device.

For example, network device 101 may manage a network connection with end station 181, and stores the state information of this connection as part of session record 113-A. Network device 102 may manage a network connection with end station 182, and stores the state information of this connection as part of session record 113-B. Thus, network device 101 does not have the necessary session record to manage a network connection with end station 102. Likewise, network device 102 does not have the necessary session record to manage a network connection with end station 101. When the split-brain is resolved, e.g., network device 101 transitions to serving as a standby ICR device, network device 102 becomes the sole active ICR device. When this resolution occurs, network device 102 must manage the network connection with end station 181. Network device 102, however, does not have the session record necessary to seamlessly communicate with end station 181. The ICR devices of the present invention overcome this limitation by performing a reconciliation sync.

Figure 2:
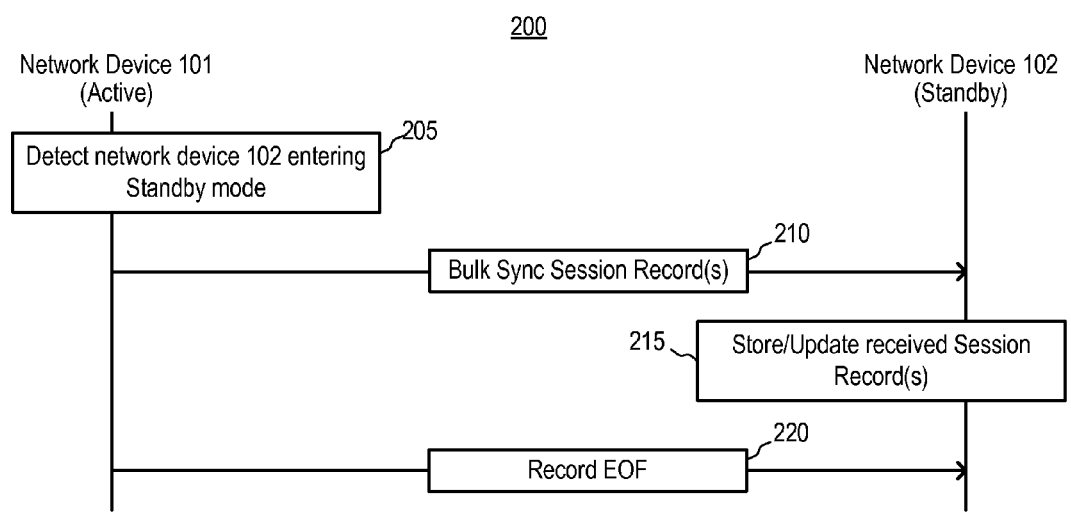
FIG. 2 is a transaction diagram illustrating a process flow for performing a bulk sync according to one embodiment.

FIG. 2 is a transaction diagram illustrating process flow 200 for performing a bulk sync of session records from network device 101 to network device 102, according to one embodiment. Process flow 200 assumes that network devices 101 and 102 have both been configured to serve as active and standby ICR device, respectively. Process flow 200 will now be discussed with reference to FIG. 1A.

Referring now to FIG. 2, at transaction 205, network device 101 detects network device 102 entering standby mode. For example, network device 102 may be a new ICR device that is added to ICR system 100. At transaction 210, network device 101 performs a bulk in response to detecting network device 102 coming up as a standby ICR device. As part of the bulk sync process, network device 101 attempts to send all the session records (e.g., session records 113-A) to network device 102, so that network device 102 has all the network information/records necessary to seamlessly take over the role of an active ICR device after a switchover event. The session records, for example, can be transmitted via network interface 117-A over synchronization channel 130 as part of ICR messages 140. At transaction 215, network device 102 stores or updates the received session records locally (e.g., as part of session records 113-B). At transaction 220, network device 101 terminates the bulk sync process by transmitting a record End Of File (EOF) message to network device 102. For example, the record EOF can be sent via network interface 117-A over synchronization channel 130 as part of ICR messages 140.

Figure 3:
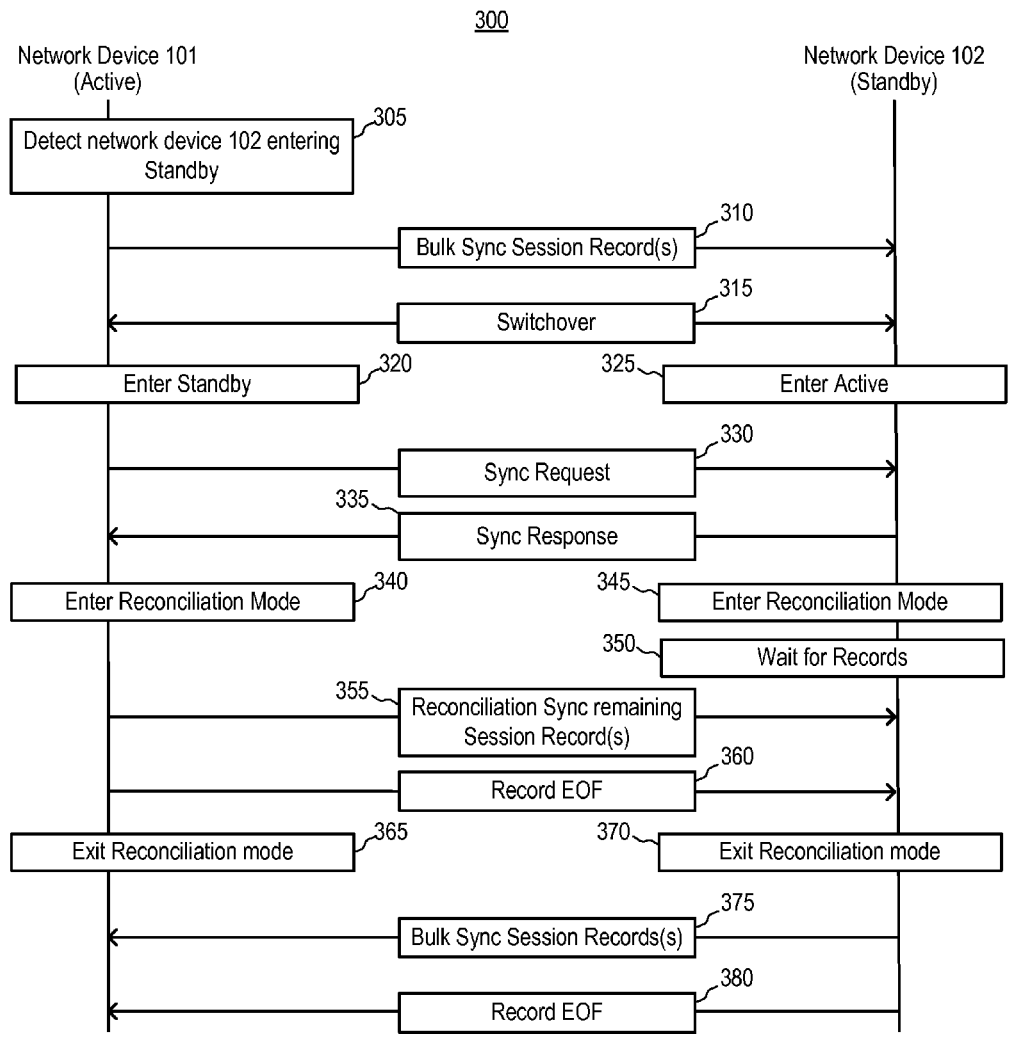
FIG. 3 is a transaction diagram illustrating a process flow for performing a reconciliation sync according to one embodiment.

FIG. 3 is a transaction diagram illustrating process flow 300 for performing a reconciliation sync of session records from network device 101 to network device 102, according to one embodiment. Process flow 300 assumes that network devices 101 and 102 have been configured to serve as active and standby ICR device, respectively. Process flow 300 will now be discussed with reference to FIG. 1A.

Referring now to FIG. 3, at transaction 305, network device 101 detects network device 102 entering standby mode. At transaction 310, network device 101 performs a bulk sync in response to detecting network device 102 coming up as a standby ICR device. As part of the bulk sync process, network device 101 attempts to send all the session records (e.g., session records 113-A) to network device 102, so that network device 102 has all the network information/records necessary to seamlessly take over the role of an active ICR device after a switchover event.

At transaction 315, prior to the bulk sync being completed, a switchover event is detected by network devices 101 and 102. A switchover event causes the ICR devices to switch role, for example from active ICR mode to standby ICR mode, and vice versa. The switchover event interrupts the bulk sync process, resulting in one or more session records failing to be transmitted to network device 102. This is problematic for a conventional ICR device because the new active ICR device (i.e., network device 102) cannot manage network connections with end stations whose session records failed to be transmitted during the bulk sync. The ICR devices of the present invention overcome this limitation by performing a reconciliation sync as described below.

At transactions 320 and 325, in response to detecting the switchover event, network devices 101 and 102 enter standby and active mode, respectively. Note that although network device 102 has transitioned to serving as an active ICR device, it does not have all the necessary network information (session records) to communicate with all the end stations due to the interrupted bulk sync. Network device 101 overcomes this limitation by performing a reconciliation sync process.

At transaction 330, network device 101 determines that a reconciliation sync is necessary (e.g., by detecting that a bulk sync was interrupted) and transmits a sync request message to network device 102. For example, the sync request message can be transmitted via network interface 117-A over synchronization channel 130 as part of ICR messages 140. In response to receiving the sync request message, at transaction 335 network device 102 transmits a sync response message to network device 101. For example, the sync response message can be transmitted via network interface 117-B over synchronization channel 130 as part of ICR messages 141.

At transactions 340 and 345, network devices 101 and 102 enter reconciliation mode. While in reconciliation mode, network devices 101 and 102 postpone processing of all requests to allocate and/or release sessions. At transaction 350, network device 102 waits for all session records to be received from network device 101. At transaction 355, network device 101 attempts to transmit the remaining session records to network device 102 by performing a reconciliation sync process. As used herein, the "remaining session records" refers to the session records that failed to be transmitted during the bulk sync due to the switchover event. At transaction 360, after transmitting all remaining session records to network device 102, network device 101 terminates the reconciliation sync process by transmitting a record EOF message to network device 102. At transactions 365 and 370, network devices 101 and 102 exit reconciliation mode.

At transaction 375, upon exiting reconciliation mode, network device 102 performs a bulk sync by transmitting session records (e.g., session records 113-B) to network device 101. This allows network device 102 to transmit session records that were added, deleted, or modified at network device 102 while the reconciliation sync was being performed. In one embodiment, network device 102 always performs a bulk sync upon exiting the reconciliation mode. In an alternate embodiment, network device 102 performs a bulk sync upon exiting the reconciliation mode only if one or more session records have been added/deleted/modified during the reconciliation sync. At transaction 380, network device 102 terminates the bulk sync by transmitting a record EOF message to network device 101.

Figure 4:
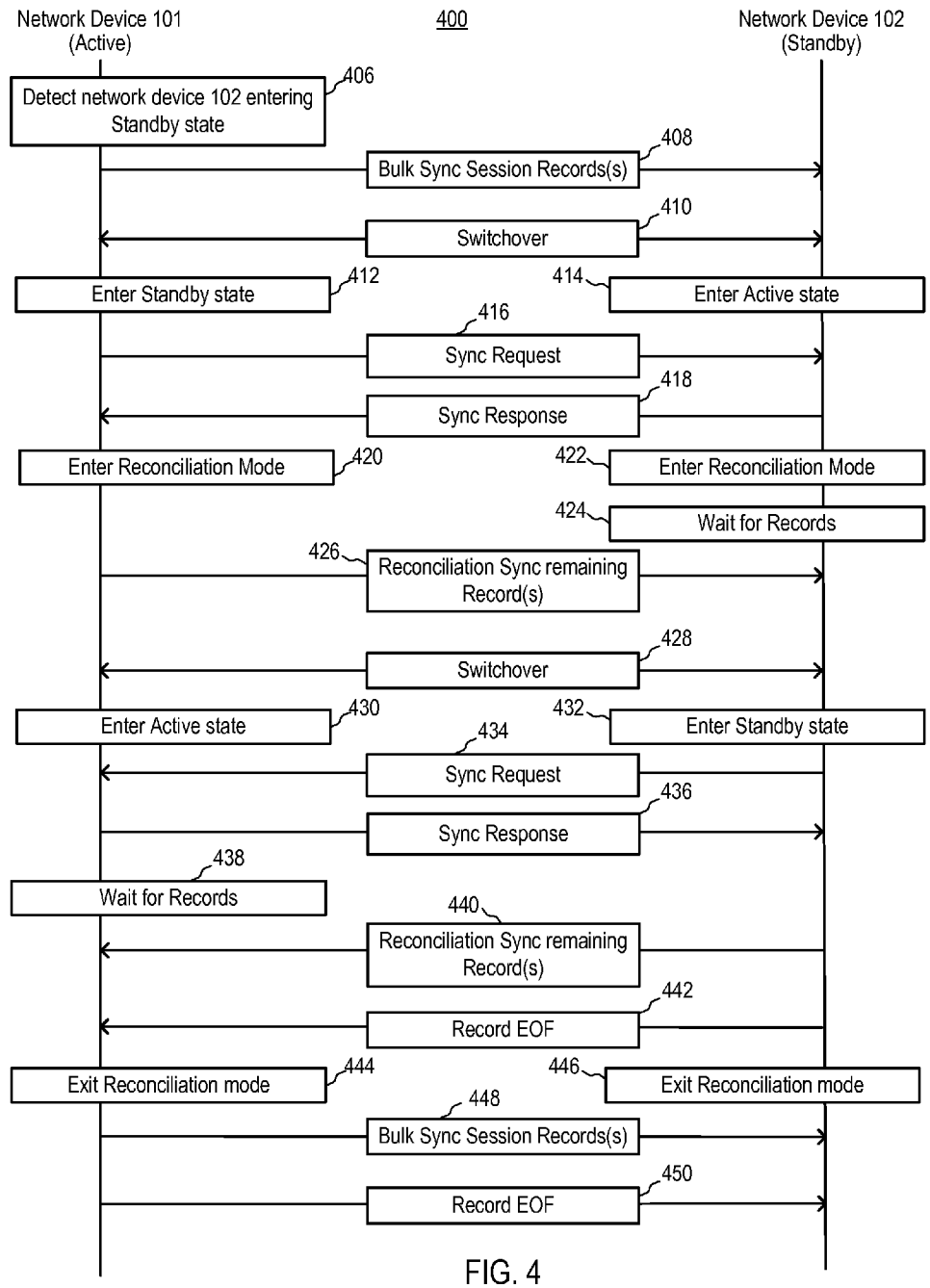
FIG. 4 is a transaction diagram illustrating a process flow for performing a reconciliation sync according to one embodiment.

FIG. 4 is a transaction diagram illustrating process flow 400 for performing a reconciliation sync of session records from network device 101 to network device 102, according to one embodiment. Process flow 400 assumes that network devices 101 and 102 have been configured to serve as active and standby ICR device, respectively, as illustrated in FIG. 1A. Process flow 400 will now be discussed with reference to FIG. 1A.

Referring now to FIG. 4, at transaction 406, network device 101 detects network device 102 entering standby mode. At transaction 408, network device 101 performs a bulk in response to detecting network device 102 coming up as a standby ICR device. As part of the bulk sync process, network device 101 attempts to send all the session records (e.g., session records 113-A) to network device 102, so that network device 102 has all the network information/records necessary to seamlessly take over the role of an active ICR device after a switchover event.

At transaction 410, prior to the bulk sync being completed, a switchover event is detected by network devices 101 and 102. The switchover event interrupts the bulk sync process, resulting in at least one session record failing to be transmitted to network device 102. At transactions 412 and 414, in response to detecting the switchover event, network devices 101 and 102 enter standby and active mode, respectively. Note that although network device 102 has transitioned to serving as an active ICR device, it does not have all the necessary network information (session records) to communicate with all the end stations. Network device 101 overcomes this limitation by performing a reconciliation sync process.

At transaction 416, network device 101 determines that a reconciliation sync is necessary and transmits a sync request message to network device 102. For example, the sync request message can be transmitted via network interface 117-A over synchronization channel 130 as part of ICR messages 140. In response to receiving the sync request message, at transaction 418 network device 102 transmits a sync response message to network device 101. For example, the sync response message can be transmitted via network interface 117-B over synchronization channel 130 as part of ICR messages 141.

At transactions 420 and 422, network devices 101 and 102 enter reconciliation mode. While in reconciliation mode, network devices 101 and 102 postpone processing of all requests to allocate and/or release sessions. At transaction 424, network device 102 waits for all session records to be received from network device 101. At transaction 426, network device 101 attempts to transmit the remaining session records to network device 102 by performing a reconciliation sync process.

A transaction 428, prior to the reconciliation sync being completed, a switchover event is detected by network devices 101 and 102. At transactions 430 and 432, network devices 101 and 102 enter active and standby ICR state, respectively. At transaction 434, after transitioning to serving as a standby ICR device, and in response to determining a reconciliation sync attempt by network device 101 was interrupted by a switchover event, network device 102 attempts its own reconciliation sync by transmitting a sync request message to network device 101. At transaction 436, in response to receiving the sync request message, network device 101 transmits a sync response message to network device 102, and waits for session records to be received from network device 102 at transaction 438.

At transaction 440, network device 102 performs a reconciliation sync by transmitting session records of session that were added, deleted, or modified while network device 101 was performing the reconciliation sync (at transaction 426). At transaction 442, network device 102 terminates the reconciliation sync by transmitting a record EOF message to network device 101. At transactions 444 and 446, network devices 101 and 102 exit reconciliation mode.

At transaction 448, upon exiting reconciliation mode, network device 101 performs a bulk sync by transmitting session records to network device 102. This allows network device 101 to transmit session records that were added, deleted, or modified at network device 101 while the reconciliation sync was being performed by network device 102 (at transaction 440). This reconciliation sync also allows network device 101 to transmit session records that failed to be transmitted during the bulk sync (at transaction 408) and reconciliation sync (at 426). In one embodiment, network device 101 always performs a bulk sync upon exiting the reconciliation mode. In an alternate embodiment, network device 101 performs a bulk sync upon exiting the reconciliation mode only if one or more session records have been added/deleted/modified during the reconciliation sync by network device 102. At transaction 450, network device 101 terminates the bulk sync by transmitting a record EOF message to network device 102.

Figure 5A:
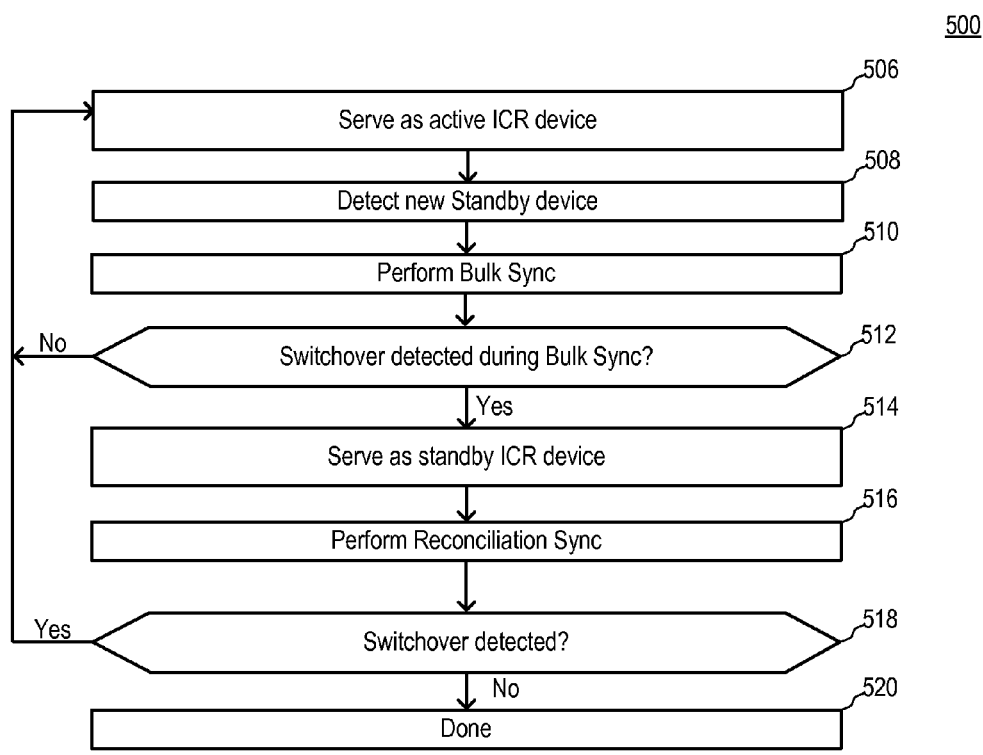
FIG. 5A is a flow diagram illustrating a method for performing a reconciliation sync according to one embodiment.

FIG. 5A is a flow diagram illustrating method 500 for performing a reconciliation sync according to one embodiment. For example, method 500 can be performed by sync modules 115-A or 1150B, both of which can be implemented in software, firmware, hardware, or any combination thereof. Method 500 will now be discussed with reference to FIG. 1A and FIG. 4, with the assumption that method 500 is performed by sync module 115-A.

Referring now to FIG. 5A, at block 506, sync module 115-A is serving as an active ICR device of ICR system 100 (e.g., as illustrated in FIG. 1A). At block 508, sync module 115-A detects a new standby ICR device (e.g., sync module 115-A detects network device 102 coming up as a standby ICR device as part of transaction 406). At block 510, in response to detecting a new standby ICR device, sync module 115-A performs a bulk sync. For example, sync module 115-A attempts to transmit all session records 113-A to network device 102 as part of transaction 408.

At block 512, sync module 115-A determines if a switchover event was detected during the bulk sync. If no switchover event was detected, sync module 115-A returns to block 506 and continues serving as an active ICR device. If sync module 115-A determines a switchover event interrupted the bulk sync (e.g., as part of transaction 410), sync module 115-A transitions to serving as a standby ICR device at block 514 (e.g., as part of transaction 414).

At block 516, in response to determining a bulk sync was interrupted by a switchover event, sync module 115-A performs reconciliation sync (e.g., as part of transactions 416-426) by transmitting session records of session records 113-A that were not transmitted to network device 102 during the bulk sync. At block 518, sync module 115-A determines if a switchover event was detected during the reconciliation sync. If so, sync module 115-A transitions back to serving as an active ICR device by returning to block 506 (e.g., as part of transaction 432). Otherwise, sync module 115-A completes the reconciliation sync at block 520 and continues serving as the standby ICR device.

Figure 5B:
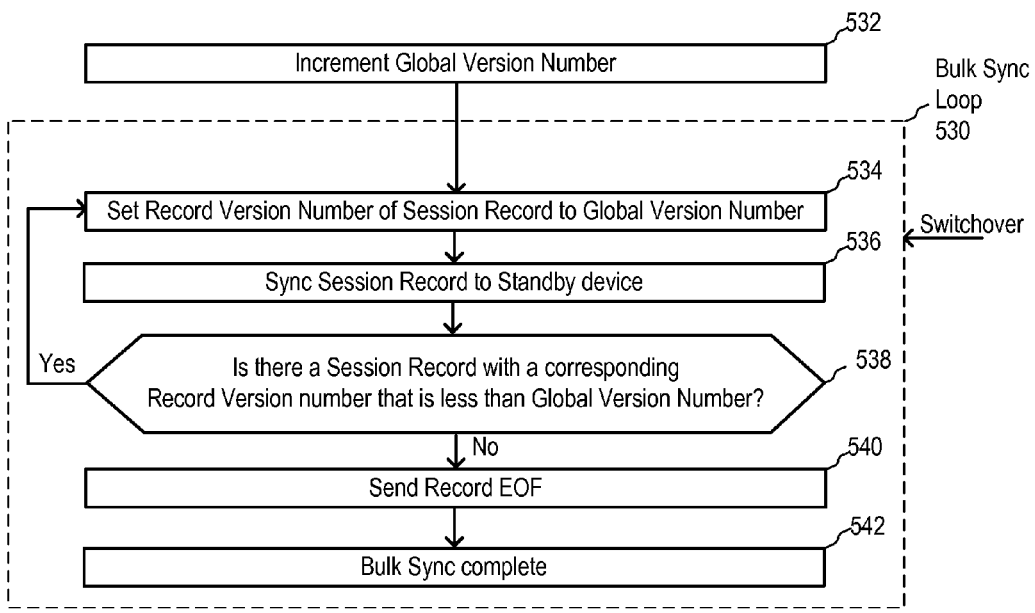
FIG. 5B is a flow diagram illustrating a method for performing a reconciliation sync according to one embodiment.

FIG. 5B is a flow diagram illustrating method 501 for performing a bulk sync according to one embodiment. For example, method 501 can be performed by sync modules 115-A or 115-B, both of which can be implemented in software, firmware, hardware, or any combination thereof. Method 501 assumes that some or all of method 500 has been performed. For example, method 501 can be performed as part of block 510 of method 500. Method 501 will now be discussed with reference to FIG. 1A and FIG. 4, with the assumption that method 501 is performed by sync module 115-A.

Referring now to FIG. 5B, at block 532 sync module 115-A increments global version number (e.g., global version number 116-A). At block 534, sync module 115-A selects a first session record (of session records 113-A) to transmit to a standby ICR device (e.g., network device 102) and sets the record version number of the selected session record to the global version number. At block 536, sync module 115-A syncs the selected session record to the standby device by transmitting the selected session record to the standby device (network device 102). At block 538, sync module 115-A determines if all session records of session records 113-A have been transmitted to the standby device by determining whether there is any record version number of record version numbers 114-A is less than global version number 116-A. If so, sync module 115-A returns to block 534 and selects a next session record to sync. Otherwise, if all session records have been synced, sync module 115-A terminates the bulk sync by transmitting a record EOF message to the standby device at transaction 540, and completes the bulk sync at block 542. Note that while sync module 115-A performs the blocks of bulk sync loop 530, a switchover event can be detected which interrupts the bulk sync process, resulting in some session records failing to be transmitted to network device 102. This is problematic because when network device 102 transitions to serving as the active ICR device, it will not have all the necessary session records to seamlessly take over the role of an active ICR device. The ICR devices of the present invention overcome this limitation by performing reconciliation sync.

Figure 5C:
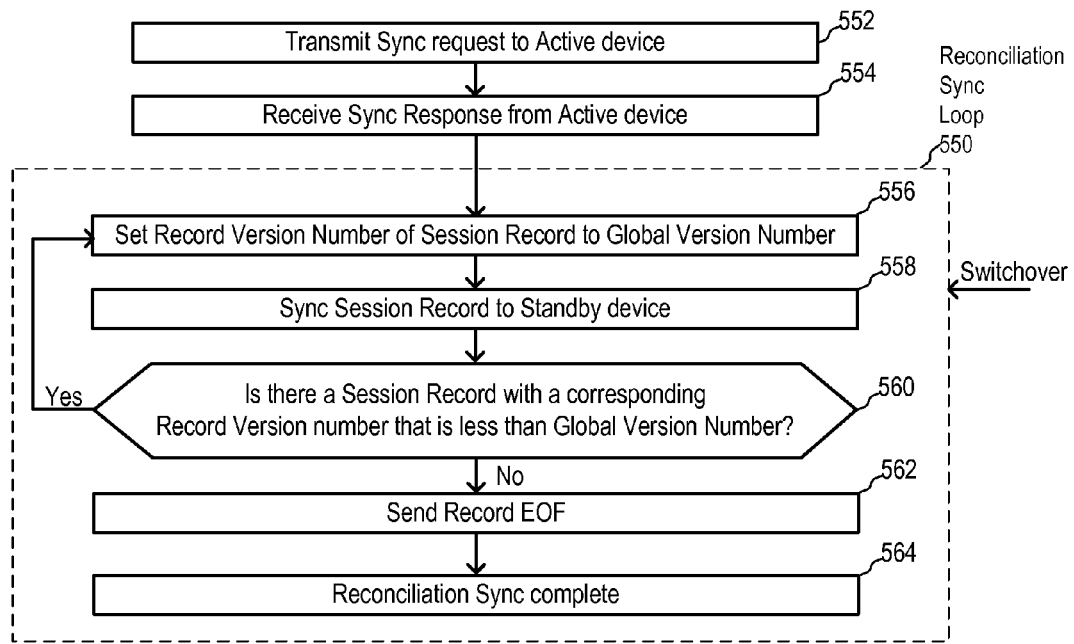
FIG. 5C is a flow diagram illustrating a method for performing a reconciliation sync according to one embodiment.

FIG. 5C is a flow diagram illustrating method 502 for performing a reconciliation sync according to one embodiment. For example, method 502 can be performed by sync modules 115-A or 115-B, both of which can be implemented in software, firmware, hardware, or any combination thereof. Method 502 assumes that some or all of method 500 has been performed. For example, method 502 can be performed as part of block 516 of method 500. Method 502 will now be discussed with reference to FIG. 1A and FIG. 4, with the assumption that method 502 is performed by sync module 115-A.

At block 552, sync module 115-A transmits a sync request message to an active ICR device, e.g., network device 102 (as part of transaction 416). At transaction 554, receives a sync response message from the active ICR device (as part of transaction 418). At block 556, sync module 115-A selects a first session record that failed to be transmitted during the bulk sync. For example, sync module 115-A finds a session record with a record version number that is less than the global version number. Sync module 115-A sets the record version number of the selected session record to the global version number. At block 558, sync module 115-A syncs the selected session record to the active device (e.g., as part of transaction 426) by transmitting the session record to the active device (network device 102). At block 560, sync module 115-A determines if all session records 113-A have been transmitted to the active device (e.g., by determining whether there is any record version number of record version numbers 114-A that is less than global version number 116-A). If at least one session record has not been transmitted to the active ICR device, sync module 115-A returns to block 556 and selects a next session record to sync. Otherwise, if all session records have been synced, sync module 115-A terminates the reconciliation sync by transmitting a record EOF message to the active ICR device at transaction 562, and completes the reconciliation sync at block 564. Note that while sync module 115-A performs the blocks of reconciliation sync loop 550, a switchover event can be detected which interrupts the reconciliation sync process, resulting in some session records failing to be transmitted to network device 102. This is problematic because network device 102 will not have all the necessary session records to seamlessly take over the role of an active ICR device. The ICR devices of the present invention overcome this limitation by performing another reconciliation sync (e.g., as part of transaction 440) and bulk sync (e.g., as part of transaction 448).

Figure 6A:
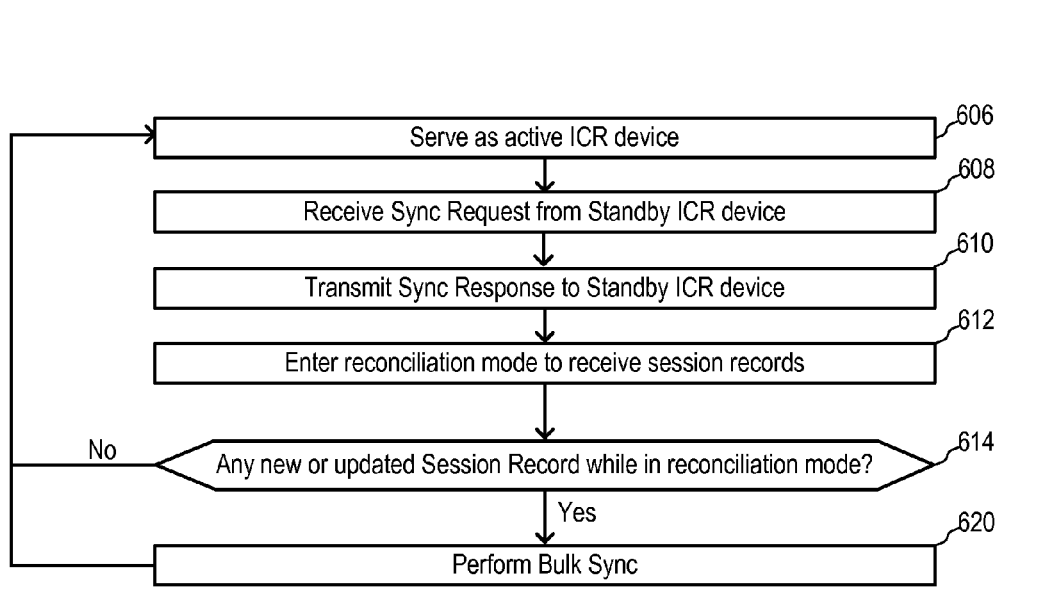
FIG. 6A is a flow diagram illustrating a method for performing a reconciliation sync according to one embodiment.

FIG. 6A is a flow diagram illustrating method 600 for performing a reconciliation sync according to one embodiment. For example, method 600 can be performed by sync modules 115-A or 1150B, both of which can be implemented in software, firmware, hardware, or any combination thereof. Method 600 will now be discussed with reference to FIG. 1A and FIG. 4, with the assumption that method 600 is performed by sync module 115-A.

At block 606, sync module 115-A serves as an active ICR device of ICR system 100. At block 608, sync module 115-A receives a sync request message from a standby ICR device, e.g., network device 102 (as part of transaction 434). At block 610, sync module 115-A transmits a sync response message to the standby device (e.g., as part of transaction 436), and enters reconciliation mode at block 612 to receive session records from the standby ICR device (e.g., as part of transaction 438). Upon receiving a record EOF message from the standby ICR device (e.g., as part of transaction 442), sync module 115-A exits reconciliation mode determines if any session record was added, deleted, or modified while sync module 115-A was in reconciliation mode. If not, sync module 115-A returns to block 606 and continues serving as an active ICR device. Otherwise, sync module 115-A performs a bulk sync at block 620 (e.g., as part of transaction 448). The operations of block 620 are similar to those illustrated in FIG. 5B.

Figure 6B:
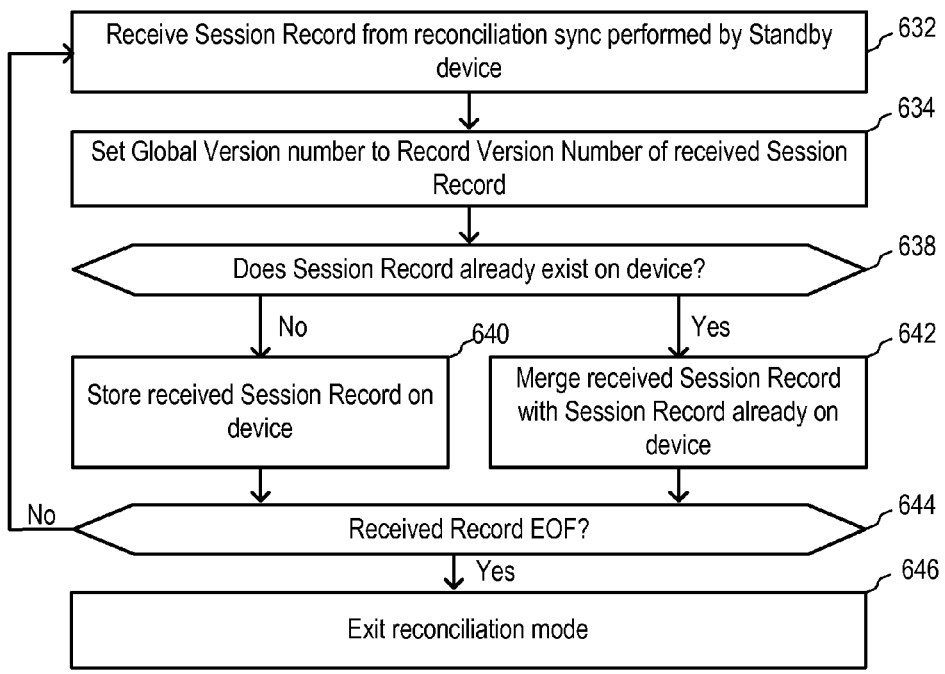
FIG. 6B is a flow diagram illustrating a method for performing a reconciliation sync according to one embodiment.

FIG. 6B is a flow diagram illustrating method 601 for performing a reconciliation sync according to one embodiment. For example, method 601 can be performed by sync modules 115-A or 115-B, both of which can be implemented in software, firmware, hardware, or any combination thereof. Method 601 assumes that some or all of method 600 has been performed. For example, method 601 can be performed as part of block 612 of method 600. Method 601 will now be discussed with reference to FIG. 1A and FIG. 4, with the assumption that method 601 is performed by sync module 115-A.

At block 632, sync module 115-A receives a session record as part of a reconciliation sync performed by a standby device, e.g., network device 102 (as part of transaction 440). At block 634, sync module 115-A sets the global version number (e.g., global version number 114-A) to the record version number of the received session record. At block 638, sync module 115-A determines if the received session record already exists at network device 101 (e.g., as part of session records 113-A). If not, at transaction 640 sync module 115-A stores the received session record, e.g., as part of session records 113-A. If the received session already exists at network device 101, at transaction 642 sync module 115-A merges the received session record with the session record already existing on network device 101. As used herein, merging the session record refers to updating the existing session record with the information from the received session record. At block 644, sync module 115-A determines if a record EOF message was received (e.g., as part of transaction 442). If so, sync module 115-A exits reconciliation mode at block 646. Otherwise, sync module 115-A returns to block 632 to receive another session record from the standby ICR device.

Figure 7:
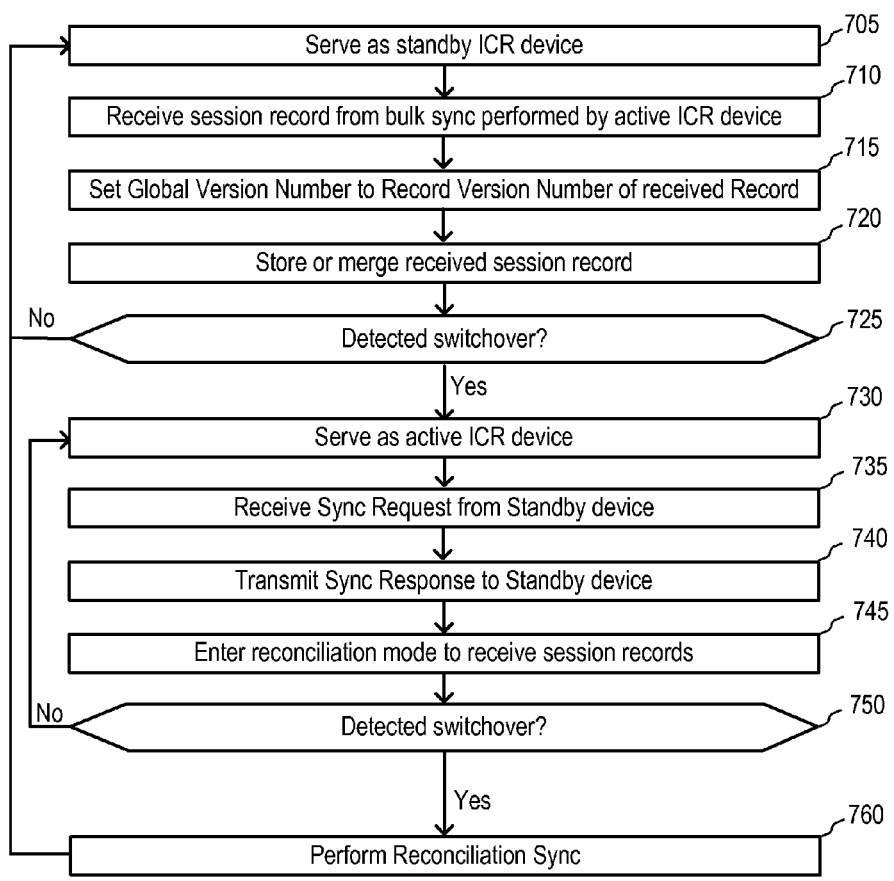
FIG. 7 is a flow diagram illustrating a method for performing a reconciliation sync according to one embodiment.

FIG. 7 is a flow diagram illustrating method 700 for performing a reconciliation sync according to one embodiment. For example, method 700 can be performed by sync modules 115-A or 115-B, both of which can be implemented in software, firmware, hardware, or any combination thereof. Method 700 will now be discussed with reference to FIG. 1A and FIG. 4, with the assumption that method 700 is performed by sync module 115-B.

At block 705, sync module 115-B serves as a standby ICR device of ICR system 100. At block 710 sync module 115-B receives a session record from as part of a bulk sync performed by an active ICR device, e.g., network device 101. For example, sync module 115-B receives the session records as part of transaction 408. At block 715, sync module 115-B sets the global version number (e.g., global version number 116-B) to the record version number of the received record session. At block 720, sync module 115-B stores or merges the received session record, e.g., as part of session records 113-B.

At block 725, sync module 115-B determines whether a switchover event is detected. If not, sync module 115-B returns to block 705 and continues serving as the standby ICR device. Otherwise, if a switchover event is detected (e.g., as part of transaction 410), sync module 115-B transitions to serving as the active ICR device at block 730 (e.g., as part of transaction 414). Note that the switchover event also causes the peer ICR device (e.g., network device 101) to switch role and serve as the standby device (as illustrated in FIG. 1B).

At block 735, sync module 115-B receives a sync request message from the standby ICR device (e.g., network device 101 as shown in FIG. 1B) as part of transaction 416. At block 740, sync module 115-B responds by transmitting a sync response message to the standby ICR device (e.g., as part of transaction 418), and enters reconciliation mode at block 745 (e.g., as part of transaction 422) to receive session records from the standby ICR device (as part of transaction 426). The operations performed at block 745 are similar to those illustrated in FIG. 6B.

At block 750, sync module 115-B determines if a switchover event was detected. If not, sync module 115-B returns to block 730 and continue serving as the active ICR device. Otherwise, if a switchover event is detected (e.g., as part of transaction 428) sync module 115-B transitions to serving as an standby ICR device and performs a reconciliation sync at block 760. Once the reconciliation sync is completed, sync module 115-B returns to block 705 to serve as a standby ICR device. The operations of block 760 are similar to those illustrated in FIG. 5C.

Figure 8:
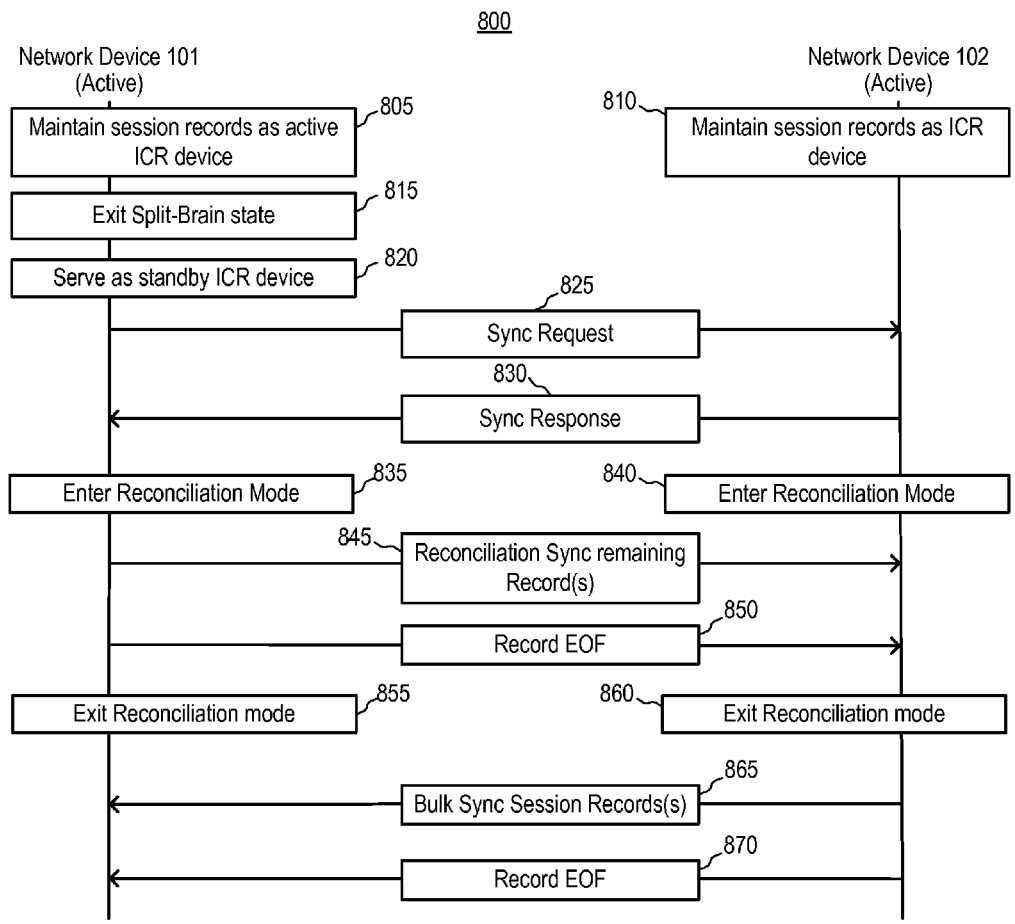
FIG. 8 is a transaction diagram illustrating a process flow for performing a reconciliation sync according to one embodiment.

FIG. 8 is a transaction diagram illustrating process flow 800 for performing a reconciliation sync of session records from network device 101 to network device 102, according to one embodiment. Process flow 800 assumes that network devices 101 and 102 have both been configured to serve as active ICR devices, as illustrated in FIG. 1C. This is known as a split-brain configuration. Process flow 800 will now be discussed with reference to FIG. 1C.

Referring now to FIG. 8, at transactions 805 and 810, network devices 101 and 102 maintain session records as active ICR devices. In other words, both network devices have active network connections with one or more end stations. Thus, each network device maintains session records that are not present in the peer network device. For example, network device 101 may contain a session record 113-A for communicating with end station 181 and network device 102 may contain a session record 113-B for communicating with end station 182.

At transaction 815, network device 101 exits split-brain configuration and serves as a standby ICR device at transaction 820. Continuing on with the above example, at this point network device 102 is the sole active ICR device, and must manage network traffic with end station 181 (which was previously managed by network device 101). Network device 102, however, does not have the session record corresponding to end station 181. Conventionally, a standby ICR device does not perform any syncing of session records to an active ICR device. Thus, under a conventional architecture, the network connection with end station 181 would be interrupted because the active ICR device (network device 102) does not have the necessary session record. The ICR devices of the present invention overcome this limitation by performing a reconciliation sync.

At transaction 825, network device 101 initiates a reconciliation sync by transmitting a sync request message to network device 102. For example, network device 101 sends a sync request message via network interface 117-A over synchronization channel 130 as part of ICR messages 140. At transaction 830, in response to receiving the sync request, network device 102 transmits a sync response message to network device 101. For example, network device 102 sends a sync response message via network interface 117-B over synchronization channel 130 as part of ICR messages 141. At transactions 835 and 840, network devices 101 and 102 enter reconciliation mode. While in reconciliation mode, network devices 101 and 102 postpone processing of all requests to allocate and/or release sessions.

At transaction 845, network device 101 performs a reconciliation sync of session records to network device 102. The reconciliation sync enables network device 102 to receive a copy of session records that network device 101 maintained while network device 101 was serving as an active ICR device in the split-brain configuration. Continuing on with the above example, the reconciliation sync allows network device 101 to transmit to network device 102 at least the session record corresponding to end station 181. This allows network device 102 to seamlessly take on the role of managing network traffic with end station 181.

At transaction 850, network device 101 terminates the reconciliation sync by transmitting a record EOF message to network device 102, in response to determining that all session records have been transmitted to network device 102. At transactions 855 and 860, network devices 101 and 102 exit reconciliation mode.

At transaction 865, network device 102 performs a bulk sync of session records to network device 101. This allows network device 102 to transmit session records that were added, deleted, or modified at network device 102 while the reconciliation sync was being performed. In one embodiment, network device 102 always performs a bulk sync upon exiting the reconciliation mode. In an alternate embodiment, network device 102 performs a bulk sync upon exiting the reconciliation mode only if one or more session records have been added/deleted/modified during the reconciliation sync. At transaction 870, network device 102 terminates the bulk sync by transmitting a record EOF message to network device 101.

Figure 9:
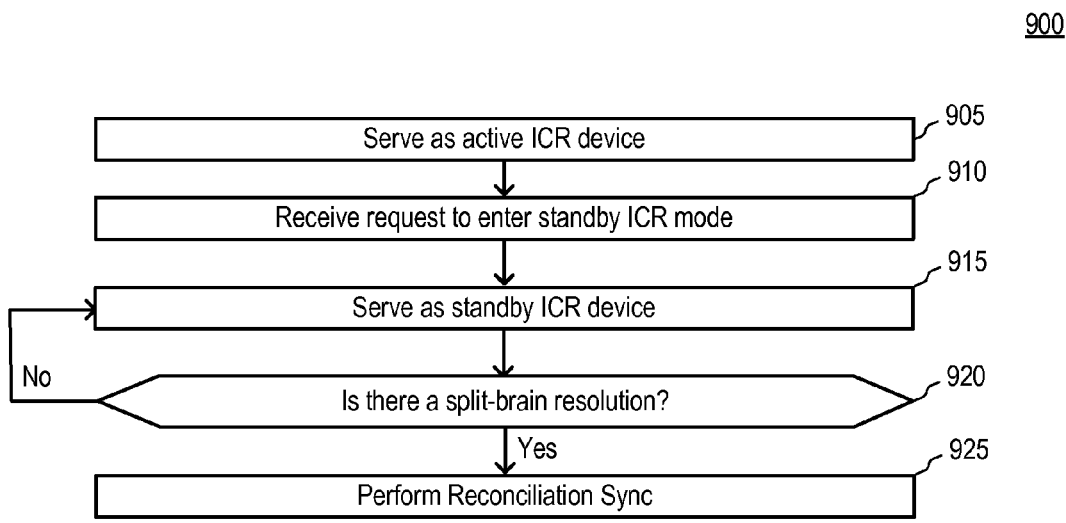
FIG. 9 is a flow diagram illustrating a method for performing a reconciliation sync according to one embodiment.

FIG. 9 is a flow diagram illustrating method 900 for performing a reconciliation sync according to one embodiment. For example, method 900 can be performed by sync modules 115-A or 115-B, both of which can be implemented in software, firmware, hardware, or any combination thereof. Method 900 will now be discussed with reference to FIG. 1C and FIG. 8, with the assumption that method 900 is performed by sync module 115-A.

Referring now to FIG. 9. At block 905, sync module 115-A is serving as an active ICR device of ICR system 100. At block 910, sync module 115-A receives a request to enter standby ICR mode. At block 915, sync module 115-A transitions to serving as a standby ICR device in response to receiving the request to enter standby ICR mode (e.g., as part of transaction 820).

At block 920, sync module 115-A determines if there was a split-brain resolution, for example, by determining whether both network devices 101 and 102 were serving as a peer active ICR devices prior to the request received at block 910. In response to determining there was no split-brain resolution (i.e., when sync module 115-A transitions to serving as a standby ICR device at block 915, it did not resolve any split-brain configuration that previously existed), sync module 115-A returns to block 915 and continues serving as a standby ICR device. Otherwise, in response to determining that there was a split-brain resolution (i.e., when sync module 115-A transitions to serving as a standby ICR device at block 915, it did resolve a split-brain configuration that previously existed), sync module 115-A performs a reconciliation sync at block 925 (e.g., as part of transaction 845). The operations of block 925 are similar to those illustrated in FIG. 5C.

Figure 10A:
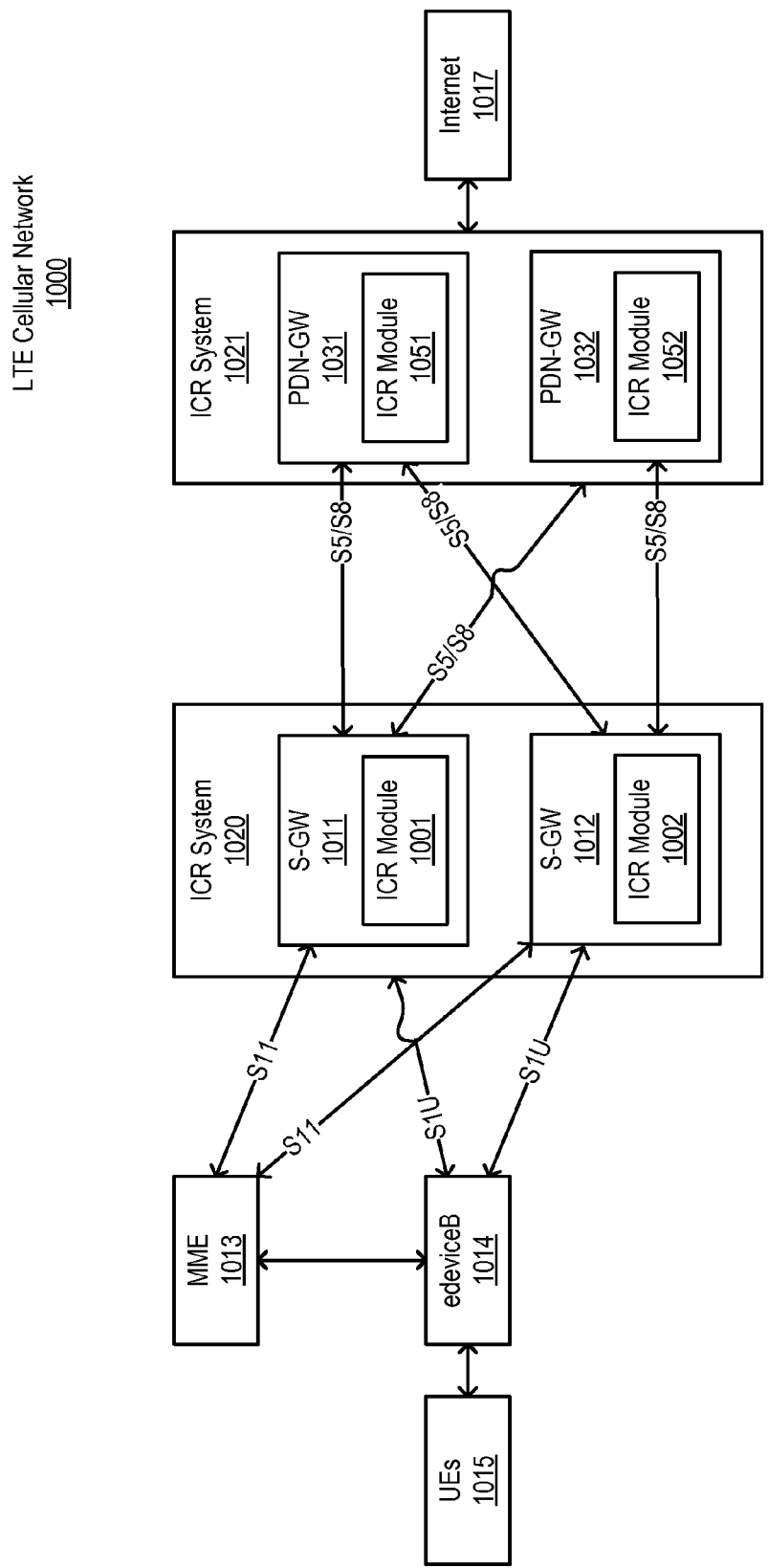
FIG. 10A is a block diagram illustrating a $3^{rd}$ Generation Partnership Project (3GPP) Long Term Evolution (LTE) cellular network for implementing an ICR system according to one embodiment.
Figure 10B:
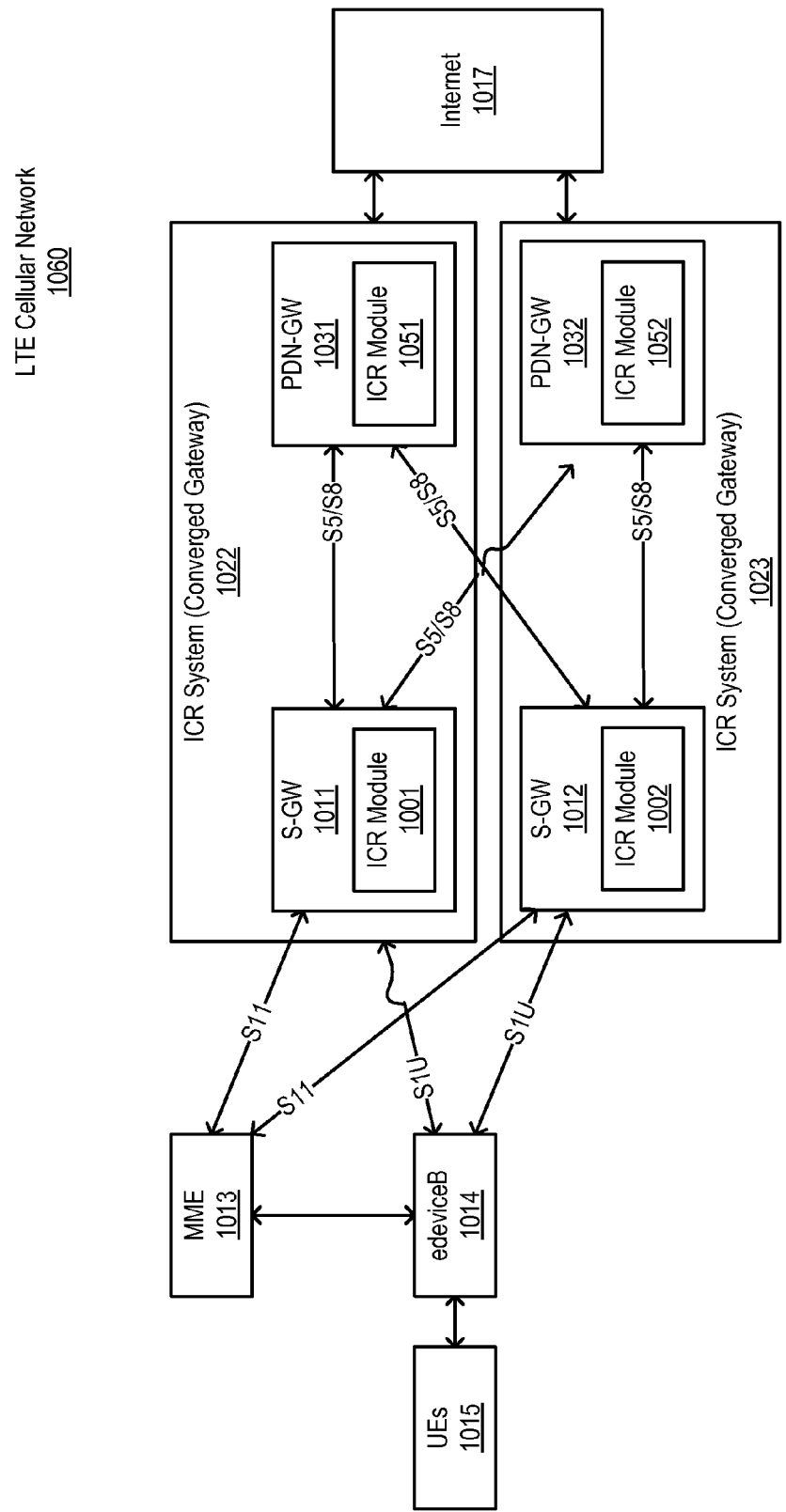
FIG. 10B is a block diagram illustrating a 3$^{rd}$ Generation Partnership Project (3GPP) Long Term Evolution (LTE) cellular network for implementing an ICR system according to one embodiment.

FIG. 10A is a block diagram illustrating a 3rd Generation Partnership Project (3GPP) Long Term Evolution (LTE) cellular network 1000 according to one embodiment. User devices or equipment (UE) 1015 (e.g., mobile phones, laptops, and other wireless devices) establish wireless connections with network 1000 through eNodeB 1014. eNodeB 1014 represents the LTE network base station. Although one eNodeB is shown, there often may be other base stations. The user data (e.g., IP packets) from/to UE 1015 can be handled by two different types of LTE network entities, referred to as a Serving Gateway (S-GW) (e.g., S-GWs 1011-1012) and a Packet Data Network Gateway (PDN-GW) (e.g., PDN-GWs 1021-1022). The S-GW and the PDN-GW are subcomponents of the System Architecture Evolution (SAE) which represents the core network architecture of LTE. The main component or core of the SAE is known as the SAE core or Evolved Packet Core (EPC). The S-GW and PDN-GW are logically separated entities according to LTE, although they may be physically deployed on either one or more physical network devices/chassis. As illustrated in FIG. 10A, the S-GW and PDN-GW are implemented as separate network devices. For example, ICR system 1020 includes SG-Ws 1011-1012, and ICR system 1021 includes PDN-GWs 1031-1032. It will be appreciated, however, that the SG-Ws and PDN-GWs can be implemented as a single network device. For example, S-GW 1011 and PDN-GW 1031 can be implemented as a single network device, e.g., a converged gateway (C-GW), which makes up a first ICR network device of an ICR system. For example, this is shown as ICR system 1022 of FIG. 10B. S-GW 1012 and PDN-GW 1032 can be implemented as a second C-GW, which makes up a second ICR network device of the ICR system. For example, this is shown in FIG. 10B as ICR system 1023.

As illustrated, S-GWs 1011-1012 are implemented as part of ICR system 1020. Each of S-GWs 1011-1012 is communicatively coupled to eNodeB 1014 by a respective user plane interface (S1U). These interfaces handle the per-bearer user plane tunneling and inter eNodeB path switching during handover. In one embodiment, the transport protocol over these interfaces is GPRS Tunneling Protocol-User plane (GTP-U). S-GWs 1011-1012 can receive user data over the S1U interfaces, and also buffer downlink IP packets destined for UE 1015. Each of S-GWs 1011-1012 is communicatively coupled to PDN-GWs 1031-1032 by a respective S5/S8 interface. The S5/S8 interfaces can provide user plane tunneling and tunnel management between S-GWs 1011-1012 and PDN-GWs 1031-1032. Each of S-GWs 1011-1012 is communicatively coupled to Mobility Management Entity (MME) 1013 by a respective S11 interface. PDN-GWs 1031-1032 can serve as gateways towards external IP networks (e.g., the Internet) 1017. PDN-GWs 1031-1032 can also include logic for IP address allocation, charging, packet filtering, policy-based control of flows, etc. Network 1000 can include other network elements, such as one or more routers between eNodeB 1014 and S-GWs 1011-1012, between S-GWs 1011-1012 and PDN-GWs 1031-1032, and/or between PDN-GWs 1031-1032 and the Internet.

In the illustrated embodiment, S-GWs 1011-1012 form ICR system 1020, although the scope of the invention is not so limited. In some embodiments, S-GWs 1011-1012 can be at different geographical locations to provide geographically distributed redundancy. S-GW 1011 includes ICR module 1001 and S-GW 1012 includes ICR module 1002. ICR modules 1001-1002 can be similar to or the same as those described elsewhere herein and/or can perform methods similar to or the same as those described elsewhere herein. For example, ICR modules 1001-1002 can perform operations similar to those performed by network devices 101 and/or 102.

In the illustrated embodiment, PDN-GWs 1031-1032 form ICR system 1021, although the scope of the invention is not so limited. In some embodiments, PDN-GWs 1031-1032 can be at different geographical locations to provide geographically distributed redundancy. PDN-GW 1031 includes ICR module 1051 and PDN-GW 1032 includes ICR module 1052. ICR modules 1051 and 1052 can be similar to or the same as those described elsewhere herein and/or can perform methods similar to or the same as those described elsewhere herein. For example, ICR modules 1051-1052 can perform operations similar to those performed by network devices 101 and/or 102.

In other embodiments, two or more other types of network elements of a cellular or other network, may have ICR modules and perform methods disclosed herein. Embodiments are applicable to various different types of Layer 2 or Layer 3 network elements in various different types of networks where providing ICR is desired.

FIG. 10B is a block diagram a 3GPP LTE cellular network 1060 according to one embodiment. Network 1060 is similar to network 1000 of FIG. 10A except that S-GW 1011 and PDN-GW 1031 are implemented as a single C-GW, and S-GW 1012 and PDN-GW 1032 are implemented as a single C-GW.

FIG. 10 is a flow diagram illustrating method 1000 for allocating IP addresses according to one embodiment. For example, method 1000 can be performed by network device 101 and/or network device 102, both of which can be implemented in software, firmware, hardware, or any combination thereof. Method 1000 is discussed below with the assumption that it is performed by network device 101. Method 1000 is discussed with reference to FIGS. 1 and 2.

Referring now to FIG. 10, at block 1005, network device 101 receives, while serving as an active ICR network device in the ICR system, a plurality of IP address requests from the third network device for plurality of client devices. For example, network device 101 receives IP address requests from network device 103 for end stations 181-182 over communication channels 131 or 231.

At block 1010, responsive to determining the second network device is serving as a standby ICR network device in the ICR system, network device 101 allocates to a first client device of the plurality of client devices a first IP address selected from a common plurality of IP addresses that are allocatable by whichever one of the first network device and the second network device is currently serving as the active ICR network device while the other one of the first network device and the second network device is currently serving as the standby ICR network device. For example, network device 101 determines that network device 102 is serving as a standby ICR device (as illustrated in FIG. 1) and selects the next available IP address from IP pool 117 (e.g., IP address 1.1.1.1) and allocates it to end station 181.

At block 1015, responsive to determining the second network device is also serving as the active ICR network device in the ICR system, network device 101 allocates to a second client device of the plurality of client devices a second IP address selected from a first portion of the commonly shared plurality of IP addresses and not a second portion of the commonly shared plurality of IP addresses, wherein the first portion of the commonly shared plurality of IP addresses is allocatable only by the first network device while the first network device and the second network device are both serving as active ICR network devices in the ICR system, and wherein the second portion of the commonly shared plurality of IP addresses is allocatable only by the second network device while the first network device and the second network device are both serving as active ICR network devices in the ICR system. For example, network device 101 determines that network device 102 is also serving as the active ICR network device (as illustrated in FIG. 2) and applies enhanced allocation algorithm 116 to select a unique IP address from IP pool 117 (e.g., an odd IP address such as IP address 1.1.1.1) and allocates it to end station 181.

Figure 11:
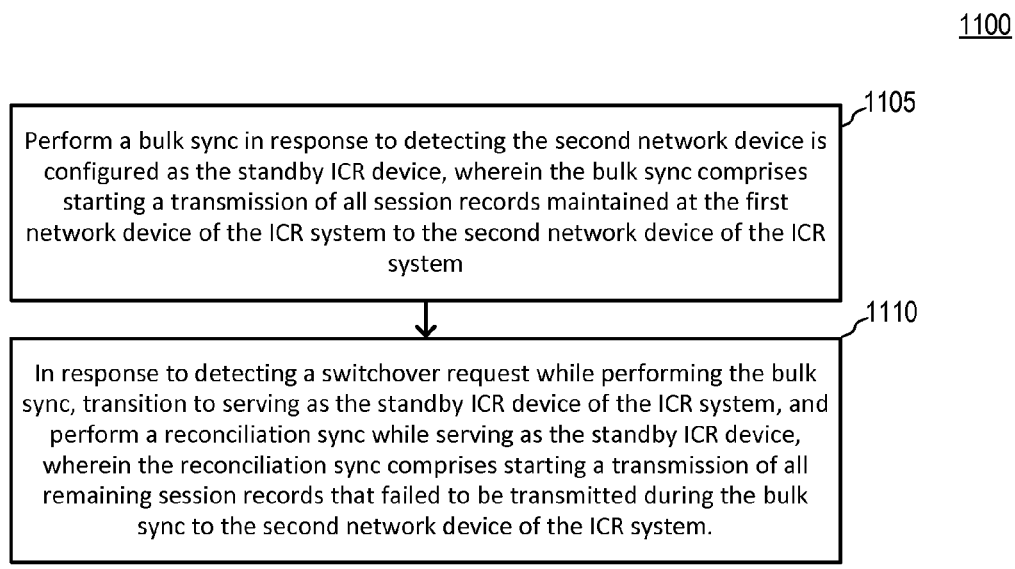
FIG. 11 is a flow diagram illustrating a method for performing a reconciliation sync according to one embodiment.

FIG. 11 is a flow diagram illustrating method 1100 for performing a reconciliation sync according to one embodiment. For example, method 1100 can be performed by sync modules 115-A or 115-B, both of which can be implemented in software, firmware, hardware, or any combination thereof. Method 1100 will now be discussed with reference to FIG. 1A and FIG. 5A, with the assumption that method 1100 is performed by sync module 115-A.

Referring now to FIG. 11. At block 1105, sync module 115-A performs a bulk sync (e.g., as part of block 510) in response to detecting a second network device (e.g., network device 102) is configured as the standby ICR device, wherein the bulk sync comprises starting a transmission of all session records (e.g., session records 113-A) maintained at the first network device (network device 101) of the ICR system to the second network device of the ICR system.

At block 1110, in response to detecting a switchover request (e.g., as part of block 512) while performing the bulk sync, sync module 115-A transitions to serving as the standby ICR device of the ICR system (as illustrated in FIG. 1B), and performs a reconciliation sync (e.g., as part of block 516) while serving as the standby ICR device, wherein the reconciliation sync comprises starting a transmission of all remaining session records that failed to be transmitted during the bulk sync to the second network device of the ICR system.

Figure 12:
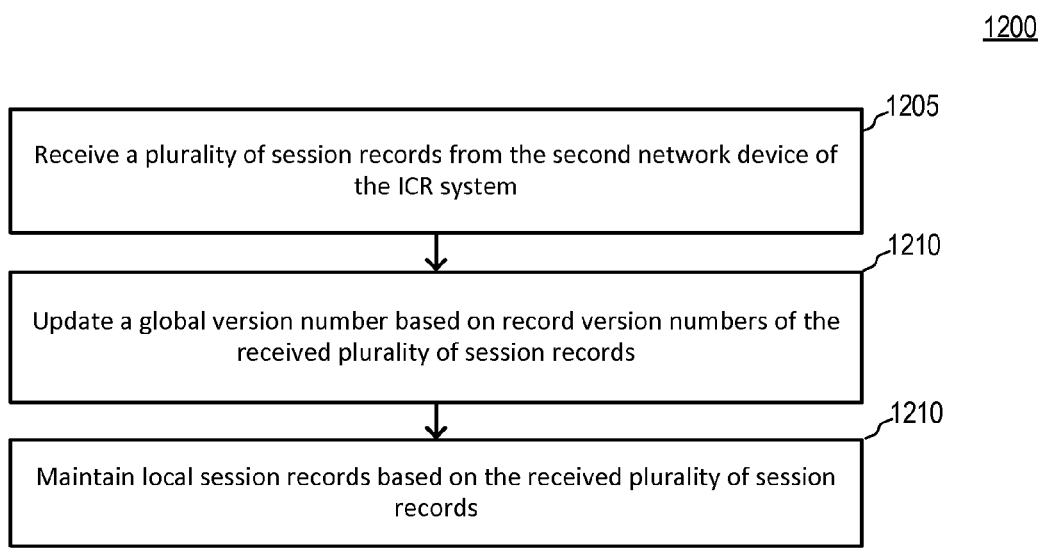
FIG. 12 is a flow diagram illustrating a method for performing a reconciliation sync according to one embodiment.

FIG. 12 is a flow diagram illustrating method 1200 for performing a reconciliation sync according to one embodiment. For example, method 1200 can be performed by sync modules 115-A or 1150B, both of which can be implemented in software, firmware, hardware, or any combination thereof. Method 1200 will now be discussed with reference to FIG. 1A and FIG. 7, with the assumption that method 1200 is performed by sync module 115-B.

Referring now to FIG. 12. At transaction 1205, sync module 115-B receives a plurality of session records from a second network device (e.g., network device 101) of the ICR system. For example, sync module 115-B receives session records as part of block 710. At transaction 1210, sync module 115-B updates a global version number based on record version numbers of the received plurality of session records. For example, sync module 115-B sets the global version number to the record version number of the received session record as part of block 715.

At transaction 1210, sync module 115-B maintains local session records based on the received plurality of session records. For example, sync module 115-B stores the received session records locally or merges the received session records with a local session record as part of block 720.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method in a first network device of an inter-chassis redundancy (ICR) system that is communicatively coupled to a second network device of the ICR system, the first network device configured as an active ICR device of the ICR system, the second network device configured as a standby ICR device of the ICR system, the method comprising:

performing a bulk sync in response to detecting the second network device is configured as the standby ICR device, wherein the bulk sync comprises starting a transmission of all session records maintained at the first network device of the ICR system to the second network device of the ICR system; and in response to detecting a switchover request while performing the bulk sync:

transitioning to serving as the standby ICR device of the ICR system, and performing a reconciliation sync while serving as the standby ICR device, wherein the reconciliation sync comprises starting a transmission of all remaining session records that failed to be transmitted during the bulk sync to the second network device of the ICR system.

2. The method of claim 1, further comprising incrementing a global version number by one prior to performing the bulk sync.

3. The method of claim 2, further comprising setting a record version number of each session record to the incremented global version number prior to transmitting the session record to the second network device of the ICR system.

4. The method of claim 3, wherein during the reconciliation sync only session records having a corresponding session record version number that is less than the incremented global version number are transmitted to the second network device of the ICR system.

5. The method of claim 1, further comprising sending a sync request message to the second network device of the ICR system prior to performing the reconciliation sync.

6. The method of claim 5, further comprising receiving a sync response message from the second network device of the ICR system prior to performing the reconciliation sync.

7. The method of claim 1, further comprising sending an end of file (EOF) message to the second network device of the ICR system to terminate the reconciliation sync when all the session records maintained at the first network device of the ICR system have been transmitted to the second network device of the ICR system.

8. A first network device of an inter-chassis redundancy (ICR) system that is communicatively coupled to a second network device of the ICR system, the first network device configured as an active ICR device of the ICR system, the second network device configured as a standby ICR device of the ICR system, the first network device comprising:
 a network interface configured to exchange sync messages with the second network device of the ICR system; and
 a sync module coupled to the network interface, configured to:
  perform a bulk sync in response to detecting the second network device is configured as the standby ICR device, wherein the bulk sync comprises starting a transmission of all session records maintained at the first network device of the ICR system to the second network device of the ICR system and
  in response to detecting a switchover request while performing the bulk sync, transition to serving as the standby ICR device of the ICR system, and perform a reconciliation sync while serving as the standby ICR device, wherein the reconciliation sync comprises starting a transmission of all remaining session records that failed to be transmitted during the bulk sync to the second network device of the ICR system.

9. The first network device of claim 8, wherein the sync module is further configured to increment a global version number by one prior to performing the bulk sync.

10. The first network device of claim 9, wherein the sync module is further configured to set a record version number of each session record to the incremented global version number prior to transmitting the session record to the second network device of the ICR system.

11. The first network device of claim 8, wherein the sync module is further configured to:
 during the reconciliation sync, transmit to the second network device of the ICR system, only session records having a corresponding session record version number that is less than the incremented global version number.

12. The first network device of claim 8, wherein the sync module is further configured to send a sync request message to the second network device of the ICR system prior to performing the reconciliation sync.

13. The first network device of claim 12, wherein the sync module is further configured to receive a sync response message from the second network device of the ICR system prior to performing the reconciliation sync.

14. The first network device of claim 8, wherein the sync module is further configured to send an end of file (EOF) message to the second network device of the ICR system to terminate the reconciliation sync when all the session records maintained at the first network device of the ICR system have been transmitted to the second network device of the ICR system.

15. A method in a first network device of an inter-chassis redundancy (ICR) system that is communicatively coupled to a second network device of the ICR system, the first network device configured as a standby ICR device of the ICR system, the second network device configured as an active ICR device of the ICR system, the method comprising:
 receiving session records from the second network device as part of a first bulk sync performed by the second network device wherein the first bulk sync comprises the second network device starting a transmission of all session records maintained at the second network device to the first network device;
 in response to detecting a switchover request, transitioning to serving as the active ICR device of the ICR system; and
 continuing to receive, while serving as the active ICR device, session records from the second network device as part of a reconciliation sync performed by the second network device, wherein the reconciliation sync comprises the second network device continuing to transmit, after it has transitioned to serving as the standby ICR device, session records that failed to be transmitted during the first bulk sync.

16. The method of claim 15, further comprising:
 for each received session record,
  storing the session record in response to determining the received session record does not already exist at the first network device, and
  updating a local session record in response to determining the local session record corresponds to the received session record.

17. The method of claim 15, further comprising:
 transmitting a sync response message to the second network device of the ICR system, in response to receiving a sync request message from the second network device, while the first network device is serving as the active ICR device of the ICR system; and
 performing a second bulk sync in response to receiving a record end of file (EOF) message from the second network device, the record EOF message indicating a termination of the reconciliation sync, wherein the second bulk sync comprises starting a transmission of all session records maintained at the first network device of the ICR system to the second network device of the ICR system.

18. A first network device of an inter-chassis redundancy (ICR) system that is communicatively coupled to a second network device of the ICR system, the first network device configured as a standby ICR device of the ICR system, the second network device configured as an active ICR device of the ICR system, the first network device comprising:
 a network interface configured to exchange sync messages with the second network device of the ICR system; and a sync module coupled to the network interface, configured to:
- receive session records from the second network device as part of a first bulk sync performed by the second network device, wherein the first bulk sync comprises the second network device starting a transmission of all session records maintained at the second network device to the first network device,
- in response to detecting a switchover request, transition to serving as the active ICR device of the IC system, and
- continue to receive, while serving as the active ICR device, session records from the second network device as part of a reconciliation sync performed by the second network device, wherein the reconciliation sync comprises the second network device continuing to transmit, after it has transitioned to serving as the standby ICR device, session records that failed to be transmitted during the first bulk sync.

19. The first network device of claim 18, wherein the sync module is further configured to:
for each received session record,
- store the session record in response to determining the received session record does not already exist at the first network device, and
- update a local session record in response to determining the local session record corresponds to the received session record.

20. The first network device of claim 18, wherein the sync module is further configured to:
- transition to serving as the active ICR device of the ICR system, in response to detecting transmit a sync response message to the second network device of the ICR system, in response to receiving a sync request message from the second network device, while the first network device is serving as the active ICR device of the ICR system and
- perform a second bulk sync in response to receiving a record end of file (EOF) message from the second network device, the record EOF message indicating a termination of the reconciliation sync, wherein the second bulk sync comprises starting a transmission of all session records maintained at the first network device of the ICR system to the second network device of the ICR system.

* * * * *